(12) United States Patent
Wallace et al.

(10) Patent No.: US 9,529,731 B1
(45) Date of Patent: Dec. 27, 2016

(54) CONTENTION-FREE APPROXIMATE LRU FOR MULTI-THREADED ACCESS

(71) Applicant: EMC Corporation, Hopkinton, MA (US)

(72) Inventors: Grant Wallace, Pennington, NJ (US); Philip Shilane, Yardley, PA (US)

(73) Assignee: EMC Corporation, Hopkinton, MA (US)

( * ) Notice: Subject to any disclaimer, the term of this patent is extended or adjusted under 35 U.S.C. 154(b) by 153 days.

(21) Appl. No.: 14/302,558

(22) Filed: Jun. 12, 2014

(51) Int. Cl.
G06F 12/12 (2016.01)
G06F 12/08 (2016.01)

(52) U.S. Cl.
CPC ......... G06F 12/122 (2013.01); G06F 12/0871 (2013.01)

(58) Field of Classification Search
CPC .. G06F 12/0871; G06F 12/122; G06F 12/123; G06F 12/124; G06F 12/126
USPC .......................................... 711/133, 134, 136
See application file for complete search history.

(56) References Cited

U.S. PATENT DOCUMENTS

| | | | |
|---|---|---|---|
| 8,621,154 | B1 | 12/2013 | Goldschmidt |
| 2008/0250203 | A1 | 10/2008 | Schreter |
| 2013/0173853 | A1* | 7/2013 | Ungureanu ........... G06F 12/124 711/103 |
| 2014/0310473 | A1* | 10/2014 | Bilas ....................... G06F 11/00 711/129 |
| 2015/0193355 | A1 | 7/2015 | Hughes |

FOREIGN PATENT DOCUMENTS

WO    WO 0113229 A2 *  2/2001  ............. G06F 9/544

OTHER PUBLICATIONS

NN85056914, IBM Technical Disclosure Bulletin, May 1985, U.S.

* cited by examiner

*Primary Examiner* — Gary Portka
(74) *Attorney, Agent, or Firm* — Blakely, Sokoloff, Taylor & Zafman LLP

(57) ABSTRACT

Exemplary methods for managing cache based on approximate least recently used (LRU) cache entries include maintaining a distributed data structure (DDS) of data elements, each corresponding to a cache entry of a plurality of cache entries, wherein each data element can be atomically accessed by multiple threads. In response to a cache eviction request from a first thread, determining an approximately LRU cache entry among the cache entries based on values atomically accessed from a first subset of the DDS of data elements, wherein the first subset of the DDS is atomically accessed using an atomic instruction without acquiring a lock to prevent another thread from accessing the first subset of the DDS to determine other approximately LRU cache entries among the cache entries, while allowing a second thread accessing a second subset of the DDS substantially concurrently. Evicting the determined approximately LRU cache entry.

18 Claims, 18 Drawing Sheets

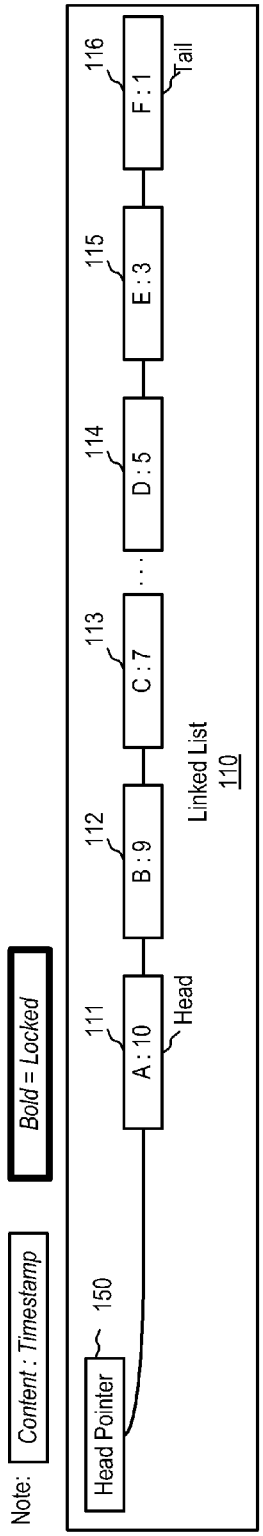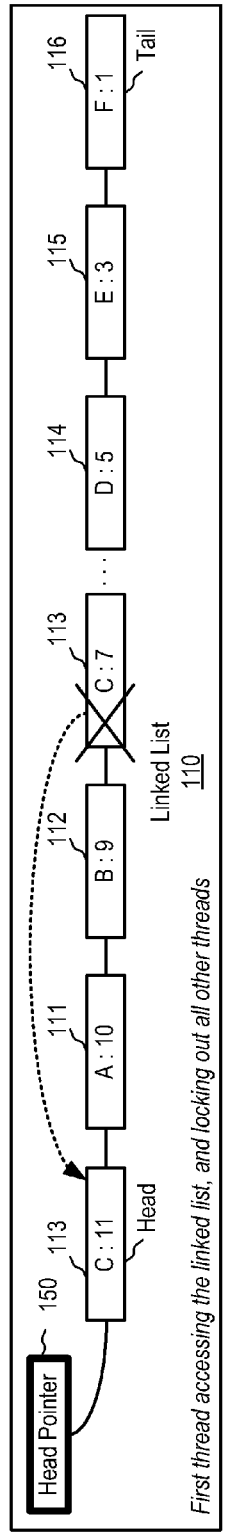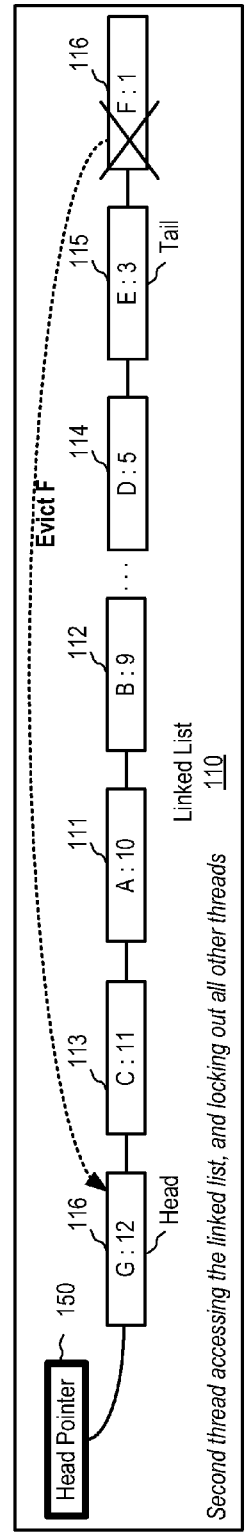

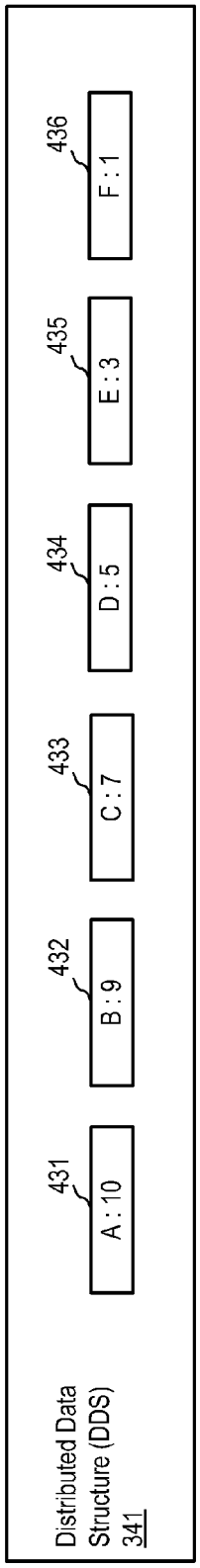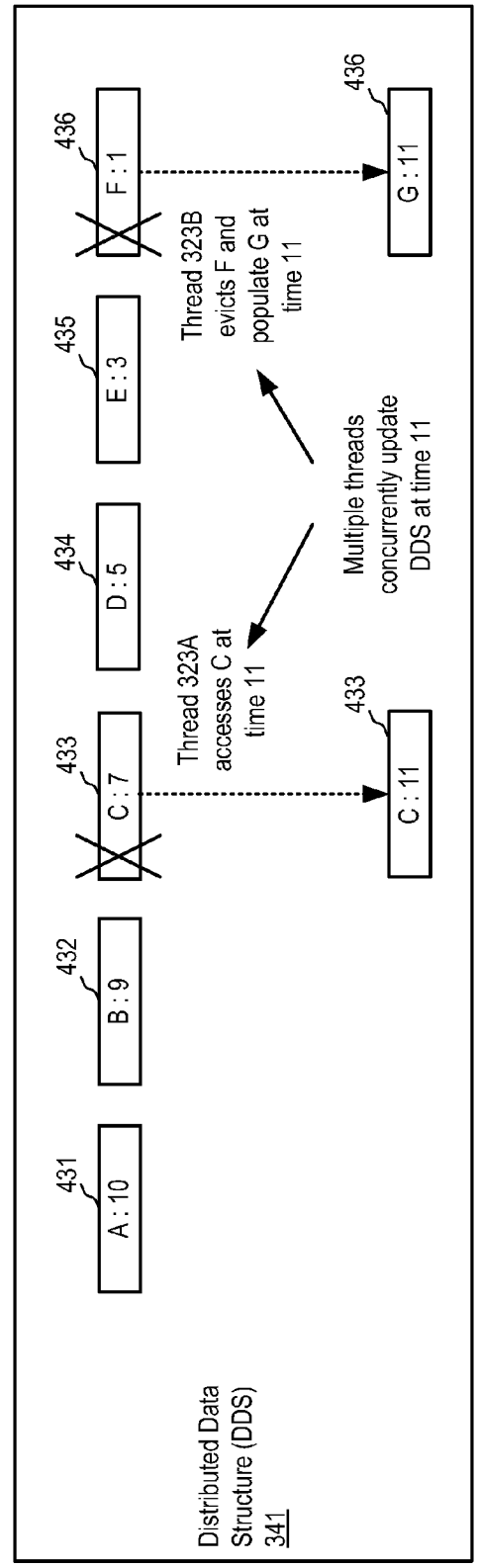

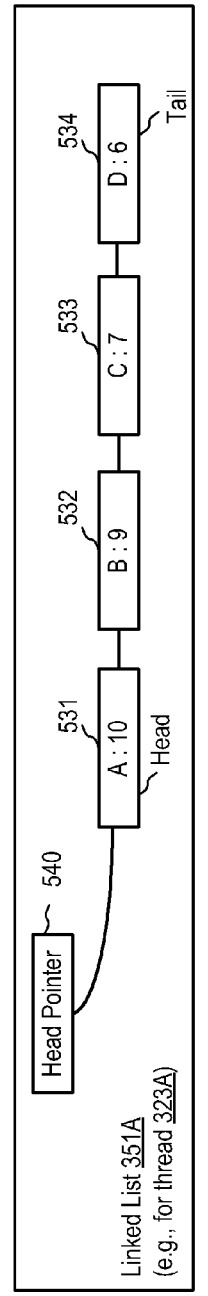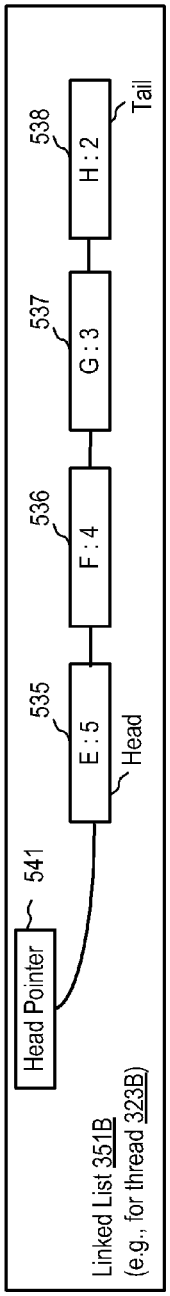
FIG. 12A
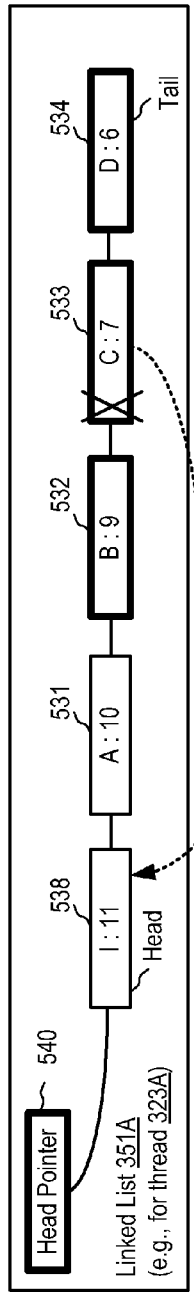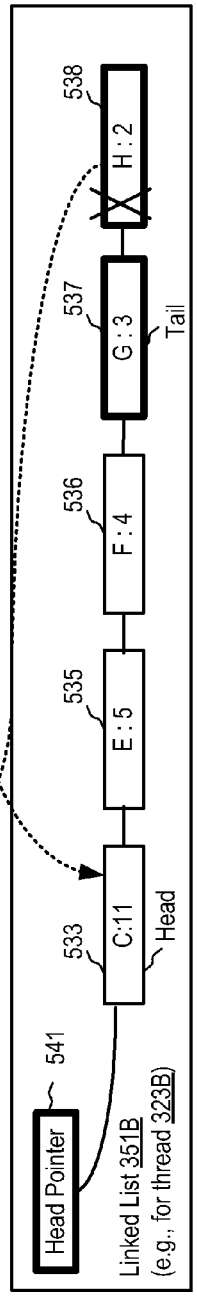
FIG. 12B
Multiple threads can concurrently update linked lists

CONTENTION-FREE APPROXIMATE LRU FOR MULTI-THREADED ACCESS

RELATED APPLICATIONS

This application is related to U.S. patent application Ser. No. 14/302,570, entitled "Maintaining a Separate LRU Linked List For Each Thread For Multi-Threaded Access," filed Jun. 12, 2014.

FIELD

Embodiments of the invention relate to storage systems; and more specifically, to improving cache utilization on a storage system.

BACKGROUND

A typical data storage system includes a cache device that stores data so that future requests for that data can be served faster. The data that is stored within a cache might be values that have been computed earlier or duplicates of original values that are stored elsewhere. If the requested data is contained in the cache (herein referred to as a cache hit), this request can be served by simply reading the cache, which is comparatively faster. On the other hand, if the requested data is not contained in the cache (herein referred to as a cache miss), the data has to be recomputed or fetched from its original storage location, which is comparatively slower. Hence, the greater the number of requests that can be served from the cache, the faster the overall system performance becomes.

During a cache miss, the storage system may evict a cache entry (also commonly referred to as a cache slot) in order to make room for the new requested data. As used herein, evicting a cache entry refers to the reusing of the cache entry to store new data. The heuristic used to select the cache entry to evict is known as the replacement policy. One popular replacement policy, "least recently used" (LRU), replaces the least recently used cache entry. Conventionally, to implement the LRU policy a single linked list of elements is maintained, wherein each linked list element is mapped (i.e., logically linked) to a cache entry.

When a cache entry is accessed, its corresponding linked list element is moved to the head of the linked list. Thus, an ordered linked list is maintained based on access time and the tail of the linked list contains the LRU entry that is chosen when eviction is needed. Such a conventional mechanism for evicting cache entries works well if the number of threads accessing the cache entries and updating the linked list is relatively low. For highly multi-threaded environments, however, the head of the list quickly becomes a bottleneck because many threads are simultaneously trying to lock the head of the list in order to insert their recently accessed element. Locking the linked list prevents other threads from updating the linked list. Thus, the system does not perform as well as expected because streams sit idle waiting to access the head of the linked list.

FIGS. 1A-1C are block diagrams illustrating linked list 110 maintained by a conventional system for implementing the LRU policy. Linked list 110 includes linked list elements 111-116, wherein each linked list element corresponds to a cache entry (not shown). Linked list element 111 is the head element and corresponds to the most recently used (MRU) cache entry. Linked list element 116 is the tail element and corresponds to the LRU cache entry. Each linked list element contains pointers (not shown) linking it to other elements in the linked list. For example, linked list element 112 contains a pointer pointing to previous element 111 and a pointer point to next element 113. Singularly-linked lists, however, only contain within each of its elements a pointer pointing to the next element. For example, if linked list 110 was singularly linked, linked list element 112 would only contain a pointer pointing to element 113. Further, linked list 110 includes head pointer data structure 150 that contains a pointer pointing to its head element 111. In FIGS. 1A-1C, each linked list element is shown with a letter followed by a colon and a number (e.g., "A:10"). Here, the letter represents the content currently stored at the corresponding cache entry, and the number represents the timestamp of when the corresponding cache entry was last accessed. Thus, in the example "A:10", the linked list element corresponds to a cache entry which contains content "A", which was accessed at time "10". Further, a bolded box indicates the linked list element is locked. As illustrated in FIG. 1A, linked list elements 111-116 contain the content:timestamps of A:10, B:9, C:7, D:5, E:3, and F:1, respectively.

Referring now to FIG. 1B, which illustrates a first thread accessing content C from the cache entry corresponding to element 113 at time 11. Thus, the first thread locks head pointer 150, and moves linked list element 113 to the head of the linked list. The first thread updates linked list element 113 with the timestamp of when the cache entry was accessed (i.e., 11). After linked list element 113 has been updated, the first thread unlocks head pointer 150. Note that during this process, other threads may be contending for access to linked list 110. In such a scenario, the other threads are stalled until the first thread has completed its processing of linked list 110. In a system having multiple threads, such a limitation can have a severe impact on system performance.

Referring now to FIG. 1C, which illustrates a second thread evicting the cache entry corresponding to element 116 at time 12. In this example, the second thread evicts content F and populates content G in the cache entry. Thus, the second thread locks head pointer 150, and moves element 116 to the head of the linked list. The second thread updates linked list element 116 with the timestamp of when the cache entry was populated (i.e., 12). After linked list element 116 has been updated, the second thread unlocks head pointer 150. Note that the requests to update linked list elements 113 and 116 (and possibly numerous other requests) may occur simultaneously. In such a scenario, the threads are stalled until the first thread has completed its processing of linked list 110.

FIG. 2 is a timeline diagram illustrating multiple threads contending for access to a linked list in a conventional implementation of the LRU policy. FIG. 2 shall be described with reference to FIGS. 1B-1C. Referring now to FIG. 2, during time period 210, a first thread has locked a linked list in order to update the head of the list. For example, in FIG. 1B, the first thread locks linked list 110 in order to update and move element 113 to the head of the list. During time period 211, a second thread is contending for access to the linked list. For example, the second thread of FIG. 1C contends for access to linked list 110 in order to update element 116. The contention may occur, for example, while the first thread is updating the linked list as shown in FIG. 1B. During time period 212, the second thread has gained access to the linked list, and updates the element. For example, the second thread of FIG. 1C updates element 116 by moving it to the head of linked list 110. Note that during time period 211, the second thread is stalled, waiting for access to the linked list. Embodiments of the present invention overcome these limitations by providing mechanisms for concurrent updating of elements corresponding to cache entries.

BRIEF DESCRIPTION OF THE DRAWINGS

Embodiments of the invention are illustrated by way of example and not limitation in the figures of the accompanying drawings in which like references indicate similar elements.

FIG. 1A is a block diagram illustrating a conventional linked list for implementing the LRU policy.

FIG. 1B is a block diagram illustrating a conventional linked list for implementing the LRU policy for cache eviction.

FIG. 1C is a block diagram illustrating a conventional linked list for implementing the LRU policy for cache eviction.

FIG. 6A is a block diagram illustrating a DDS according to one embodiment.

FIG. 6B is a block diagram illustrating concurrent updating of a DDS according to one embodiment.

FIG. 12A is a block diagram illustrating multiple linked lists according to one embodiment.

FIG. 12B is a block diagram illustrating concurrent updating of multiple linked lists according to one embodiment.

DESCRIPTION OF EMBODIMENTS

Figure 2:
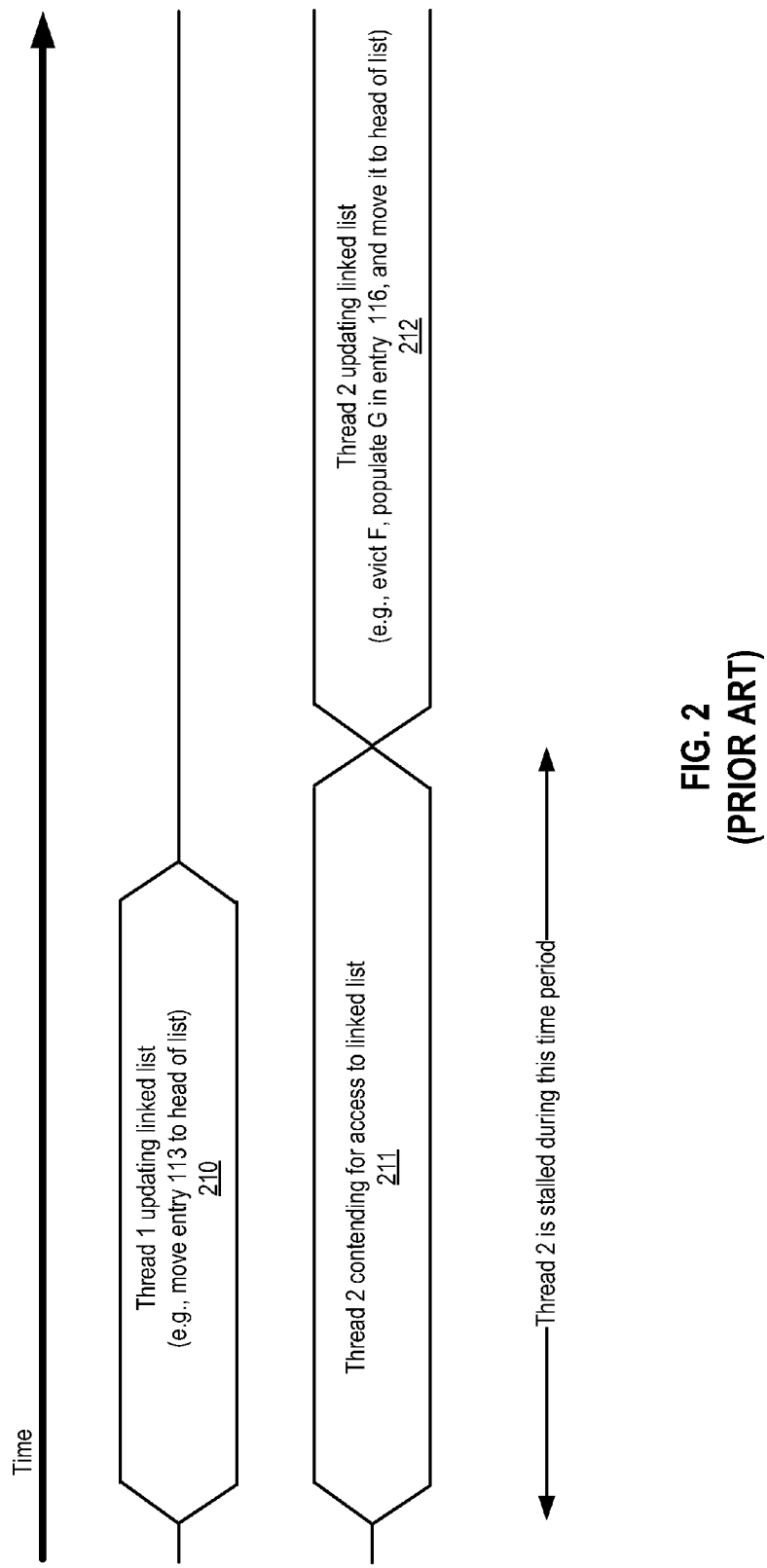
FIG. 2 is a timing diagram illustrating multiple threads contending for access to a single linked list in a conventional implementation of the LRU policy.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Techniques for minimizing contention when performing cache eviction in a multi-threaded system are described herein. In one aspect of the invention, a cache manager maintains a distributed data structure (DDS) of data elements, wherein each data element is associated with a cache entry. Each data element contains information, such as, for example, a timestamp of when its corresponding cache entry was last accessed. In one embodiment, the cache manager uses the timestamps of the data elements to determine an approximately LRU cache entry.

In one embodiment, when a thread accesses a cache entry, the cache manager atomically updates the corresponding DDS data element to indicate that the cache entry has been recently accessed. As used herein, accessing a cache entry refers to reading from, or writing to a cache entry. In one embodiment, the cache manager updates the DDS element with the timestamp of when the cache entry was accessed.

In some instances, cache eviction may be necessary in order to populate (i.e., write) new data in the cache. In one embodiment, in order to determine the LRU cache entry for eviction purposes, the cache manager processes the DDS elements to determine which of the processed DDS elements contains the "oldest" timestamp. Throughout the description, timestamps are described using relative terms such as "older", "oldest", etc. In one embodiment, a smaller, non-zero timestamp is considered to be older than a larger timestamp. Other aging conventions, however, can be used without departing from the broader scope and spirit of the present invention. A zero timestamp, in one embodiment, has a special meaning. For example, a zero timestamp can mean that the cache entry and corresponding DDS element is being evicted. In one embodiment, the cache manager compares the timestamps of the processed DDS elements to identify the DDS element with the smallest, non-zero value among all the processed DDS elements. In such an embodiment, the cache entry corresponding to the identified DDS element is determined to be the LRU cache entry.

In an alternate embodiment, in order to determine the LRU cache entry, the cache manager maintains a running average and a running standard deviation of the timestamps as the DDS elements are updated. In such an embodiment, the cache manager processes the DDS elements until the first DDS element with a timestamp that is non-zero and at least a predetermined number of standard deviations from the running average is identified. The cache entry corresponding to such an identified DDS element is determined to be the approximate LRU cache entry. In one embodiment, if none of the DDS elements contains a timestamp which is non-zero and at least a predetermined number of standard deviations from the running average, the cache manager selects the DDS element with the smallest, non-zero timestamp among all the processed DDS elements as the oldest DDS element, and the corresponding cache entry is determined to be the approximate LRU.

In one embodiment, in order to reduce the amount of time required to determine the LRU cache entry, only a subset (i.e., portion) of the DDS is processed. Thus, the cache entry determined to be the LRU may not truly be the LRU. Rather, such a cache entry is only "approximately" the LRU. In such an embodiment, each time the eviction process is performed, the cache manager selects a different subset of the DDS to process. In this way, the cache manager avoids the possibility of repeatedly evicting the same set of cache entries.

As described above, conventionally the LRU policy is implemented using a single ordered linked list, and contention by multiple threads for access to the head of the single ordered linked list can impair performance of the system. Embodiments of the present invention overcome these limitations by providing atomic access to the DDS elements. In such an embodiment, the cache manager is able to handle multiple threads accessing the cache entries and updating the DDS concurrently. Atomic access is described in further details below.

In one embodiment, after identifying an approximate LRU cache entry as described above, the cache manager performs a "compare-and-swap" operation. As used herein, a "compare-and-swap" operation comprises a thread comparing an in-memory integer to the value that the thread believes it to be, and if they are equal, the thread swaps a different integer value into that memory location. This is all done atomically without the calling thread explicitly acquiring a lock, wherein the "compare-and-swap" operation is performed using an atomic instruction supported by the hardware or processor. This allows the calling thread to check the value of an integer at time 1, and then change the value at time N only if that value has not changed since it was checked at time 1. If another thread has changed the value in the meantime, then the swap fails, and the calling thread will need to handle that case. In one embodiment, after the cache manager identifies the approximate LRU cache entry, the cache manager returns to the identified timestamp and determines if the timestamp has changed since it was identified using the "compare-and-swap" operation described above. If the value has changed, then the "compare-and-swap" operations fails, and then the cache manager will have to identify another approximate LRU cache entry.

In one embodiment, as part of a successful "compare-and-swap" operation, the cache manager swaps the timestamp of the corresponding DDS element with a zero to indicate that the cache entry is being evicted. In this way, the cache manager prevents other threads from attempting to evict the same cache entry. One having ordinary skill in the art would recognize that a value other than zero can be used.

In one embodiment, after the data has been populated in the evicted cache entry, the cache manager updates the corresponding DDS element with the timestamp of when the data was populated in the cache entry.

According to another aspect of the invention, the cache manager maintains a plurality of linked lists of elements, each linked list of elements corresponding to one or more threads in the system that accesses the cache entries. Each linked list element is associated with a cache entry. As used herein, a linked list corresponding to a thread means that the thread accessed the cache entries corresponding to the elements of the linked list. In one embodiment, each linked list element contains information of its corresponding cache entry, such as, for example, a timestamp of when its corresponding cache entry was last accessed. Each linked list comprises a head element and a tail element, the head element corresponding to a most recently used (MRU) cache entry among all cache entries accessed by the corresponding thread, and the tail element corresponding to a LRU cache entry among all cache entries accessed by the corresponding thread.

In one embodiment, when a cache entry is accessed by a thread, the cache manager identifies the linked list element corresponding to the accessed cache entry. In one embodiment, the cache manager locks the identified linked list element and its neighbor (i.e., adjacent) linked list elements in order to prevent other threads from updating or evicting the same linked list elements. In one embodiment, the cache manager also locks the head of the linked list corresponding to the thread that accessed the entry. According to one embodiment, the cache manager removes the identified linked list element from its current/original linked list, and inserts it at the head of the linked list corresponding to the thread that accessed the cache entry. The cache manager updates the moved linked list element with a timestamp of when the corresponding cache entry was accessed. The cache manager then removes the identified linked list element from its original linked list, re-links the linked list elements that were adjacent to the removed linked list element, and unlocks all locked linked list elements.

In one embodiment, in order to determine the LRU cache entry, the cache manager processes the tail elements of the linked lists to identify the tail element with the oldest timestamp. The cache entry corresponding to the identified tail element is determined to be the LRU. According to one embodiment, after a tail element is identified as the LRU, the cache manager locks the identified tail element and its neighbor (i.e., adjacent) linked list element in order to prevent other threads from evicting the same tail element. In one embodiment, the cache manager also locks the head of the linked list corresponding to the thread that is evicting the cache entry. In one embodiment, the cache manager populates the data in the cache entry and updates the corresponding identified tail element has been updated. The cache manager removes the identified tail element from its original linked list, and inserts it at the head of the linked list corresponding to the thread that is evicting the cache entry. The cache manager then re-links the linked list elements that were adjacent to the removed linked list element, and unlocks all locked linked list elements.

In one embodiment, in order to reduce the amount of time required to determine the LRU cache entry, only a subset (i.e., portion) of the tail elements are processed. Thus, the cache entry determined to be the LRU may not truly be the LRU. Rather, such a cache entry is only "approximately" the LRU. In such an embodiment, each time the eviction process is performed, the cache manager may select a different subset of the tail elements to process. In this way, the cache manager avoids the possibility of repeatedly evicting the same set of cache entries.

In some instances, one or more linked lists may become "dead". Here, a dead linked list refers to a linked list that is no longer associated with any active thread. For example, a thread which has exited (i.e., been de-allocated) may leave behind a linked list of elements that is not associated with any active thread. According to one embodiment, in such a scenario, the cache manager evicts the cache entries corresponding to the elements of the dead linked lists first, even though they may not be the LRU. Alternatively, the cache manager may merge (i.e., link) the dead linked list to a live linked list. For example, a dead linked list may be merged to the tail of a live linked list. As used herein, a live linked list is linked list which is associated with a live/existing thread.

By maintaining multiple linked lists, embodiments of the present invention overcome the limitations described above. There may be contention by multiple threads, however, for access to the linked list elements that are locked as described above. It should be noted, however, that the probability of multiple threads contending for these locked linked list elements are low because the probability of multiple threads concurrently accessing the same regions of data are low.

Figure 3:
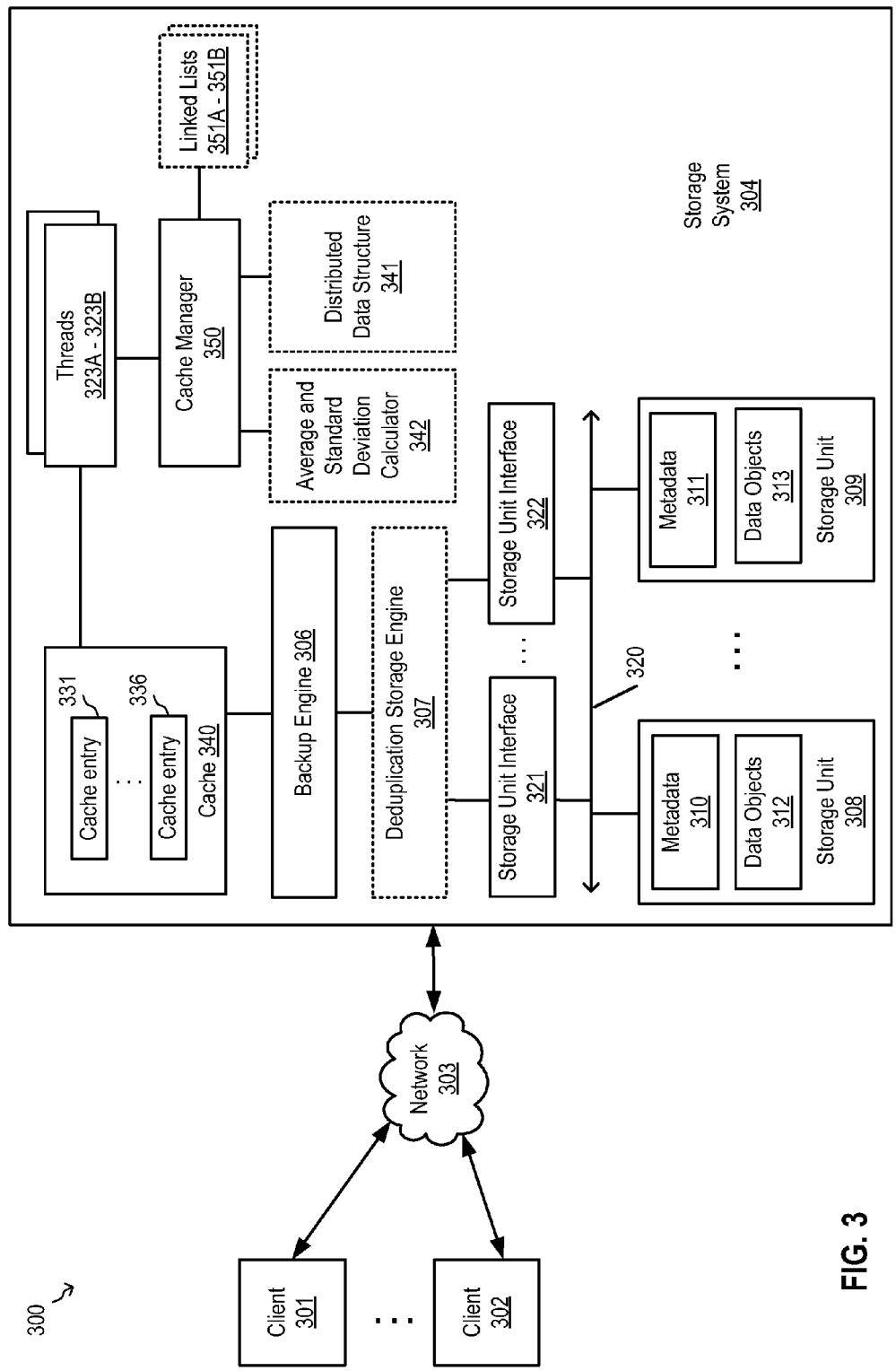
FIG. 3 is a block diagram illustrating a system according to one embodiment.

FIG. 3 is a block diagram illustrating a storage system according to one embodiment of the invention. Referring to FIG. 3, system 300 includes, but is not limited to, one or more client systems 301-302 communicatively coupled to storage system 304 over network 303. Clients 301-302 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Network 303 may be any type of networks such as a local area network (LAN), a wide area network (WAN) such as Internet, a corporate intranet, a metropolitan area network (MAN), a storage area network (SAN), a bus, or a combination thereof, wired and/or wireless.

Storage system 304 may include any type of server or cluster of servers. For example, storage system 304 may be a storage server used for any of various different purposes, such as to provide multiple users with access to shared data and/or to back up mission critical data. Storage system 304 may be, for example, a file server (e.g., an appliance used to provide network attached storage (NAS) capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Storage system 304 may have a distributed architecture, or all of its components may be integrated into a single unit. Storage system 304 may be implemented as part of an archive and/or backup system such as a storage system available from EMC® Corporation of Hopkinton, Mass.

In one embodiment, storage system 304 includes, but is not limited to, backup engine 306, deduplication storage engine 307, and one or more storage units 308-309 communicatively coupled to each other. Backup engine 306 is configured to backup data from one or more source storage devices to one or more destination storage devices. The source and destination/target storage devices can be internal, external, or a combination of both. Storage units 308-309 may be implemented locally (e.g., single node operating environment) or remotely (e.g., multi-node operating environment) via interconnect 320, which may be a bus and/or a network. In one embodiment, one of the storage units 308-309 operates as an active storage to receive and store external or fresh user data, while the other storage unit operates as a target storage unit to periodically archive data from the active storage unit according to an archiving policy or scheme. Storage units 308-309 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 308-309 may also be a combination of such devices. In the case of disk storage media, the storage units 308-309 may be organized into one or more volumes of Redundant Array of Inexpensive Disks (RAID).

In response to data (e.g., a data file) to be stored in storage units 308-309, optional deduplication storage engine 307 is configured to segment the data into multiple chunks according to a variety of segmentation policies or rules. Deduplication storage engine 307 may choose not to store a chunk in a storage unit if the chunk has been previously stored in the storage unit. In the event that deduplication storage engine 307 chooses not to store the chunk in the storage unit, it stores metadata enabling the reconstruction of the data using the previously stored chunk. As a result, chunks of the data are stored in a deduplicated manner, either within each of storage units 308-309 or across at least some of storage units 308-309. Data stored in the storage units may be stored in a compressed form (e.g., lossless compression: Huffman coding, Lempel-Ziv Welch coding; delta encoding: a reference to a chunk plus a difference; etc.). In one embodiment, different storage units may use different compression methods (e.g., main or active storage unit from other storage units, one storage unit from another storage unit, etc.).

The metadata, such as metadata 310-311, may be stored in at least some of storage units 308-309, such that data can be accessed independent of another storage unit. Metadata of each storage unit includes enough information to provide access to the data it contains. In one embodiment, metadata may include fingerprints contained within data objects 312-313, where a data object may represent a data chunk, a compression region (CR) of data chunks, or a container of one or more CRs. Fingerprints are mapped to a particular data object via metadata 310-311, enabling the system to identify the location of the data object containing a chunk represented by a particular fingerprint. When an active storage unit fails, metadata contained in another storage unit may be utilized to recover the active storage unit. When one storage unit is unavailable (e.g., the storage unit has failed, or is being upgraded, etc.), the system remains up to provide access to any data not stored in the failed storage unit. When data is deleted, the metadata associated with the data in the system is updated to reflect that the data has been deleted.

In one embodiment, the metadata information includes a file name, a storage unit where the chunks associated with the file name are stored, reconstruction information for the file using the chunks, and any other appropriate metadata information. In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for chunks in storage units, identifying specific data objects).

In one embodiment, the storage system as shown in FIG. 3 may be used as a tier of storage in a storage hierarchy that comprises other tiers of storage. One or more tiers of storage in this hierarchy may utilize different kinds of storage devices and/or may be optimized for different characteristics such as random update performance. Data are periodically moved among the tiers based on data management policies to achieve a cost-effective match to the current storage requirements of the data. For example, data may initially be stored in a tier of storage that offers high performance for reads and writes. As the data ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

In one embodiment, storage system 304 includes one or more network interfaces (not shown) for communicating with other networked devices (e.g., clients 301-302). A network interface may be physical or virtual; and an interface address is an IP address assigned to a network interface, be it a physical network interface or virtual network interface. A physical network interface is hardware in a network device through which a network connection is made (e.g., wirelessly through a wireless network interface controller (WNIC) or through plugging in a cable to a port connected to a network interface controller (NIC)). Typically, a network device has multiple physical network interfaces. A virtual network interface may be associated with a physical network interface, with another virtual interface, or stand on its own (e.g., a loopback interface, a point to point protocol interface). A network interface (physical or virtual) may be numbered (a network interface with an IP address) or unnumbered (an network interface without an IP address). A loopback interface (and its loopback address) is a specific type of virtual network interface (and IP address) of a node (physical or virtual) often used for management purposes; where such an IP address is referred to as the nodal loopback address. The IP address(es) assigned to the network interface (s) of a network device, are referred to as IP addresses of that network device; at a more granular level, the IP address(es) assigned to network interface(s) assigned to a node implemented on a network device, can be referred to as IP addresses of that node.

According to one embodiment, storage system 304 includes cache manager 350 to handle requests from threads 323A-323B to access data (e.g., read/write data from/to storage units 308-309 via cache 340). For example, threads 323A-323B may be created by a file accessing application. Although two threads are illustrated, it shall be understood that the present invention is not so limited. In one embodiment, cache 340 is partitioned into a pool of entries. In the illustrated embodiment, cache 340 is made up of cache entries 331-336. It shall be understood, however, that cache 340 can be partitioned into more or less cache entries than shown.

In one embodiment, when cache manager 350 detects a request from threads 323A-323B to read data from storage, cache manager 350 first checks cache 340. If the requested data can be found in cache 340 (i.e., a cache hit), the data in cache 340 is used instead of fetching the requested data from the storage device, resulting in a faster access. On the other hand, when cache manager 340 determines that the requested data does not exist in cache 340 (i.e., a cache miss), the requested data is fetched from the storage device, resulting in a slower access. During a cache miss, cache manager 350 may evict a cache entry in order to make room for the new requested data. Similarly, when cache manager 350 detects a request from threads 323A-323B to write data to storage, cache manager 350 may evict a cache entry to make room for the write data. As used herein, evicting a cache entry refers to the reusing of the cache entry to store new data.

The heuristic used to select the cache entry to evict is known as the replacement policy. One popular replacement policy, "least recently used" (LRU), replaces the least recently used cache entry. As described above, conventional implementations of the LRU policy suffers from the limitation of multiple threads contending for access to a single linked list. In one embodiment of the present invention, storage system 304 overcomes this limitation by including distributed data structure (DDS) 341.

Figure 4:
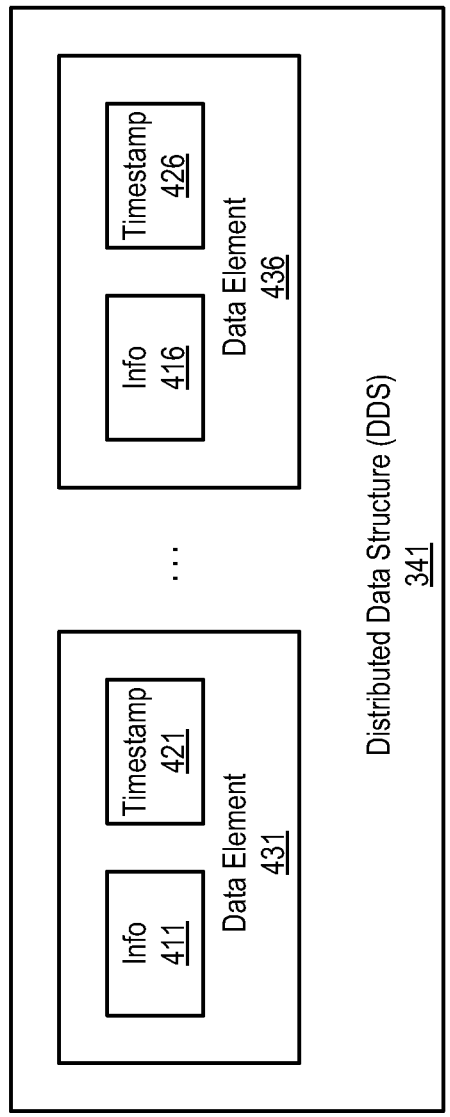
FIG. 4 is a block diagram illustrating a distributed data structure according to one embodiment.

FIG. 4 is a block diagram illustrating DDS 341 according to one embodiment. DDS 341 includes data elements 431-436. More or less data elements, however, can be implemented. In one embodiment, each of data elements 431-436 corresponds to a cache entry. For example, data elements 431-436 can correspond to cache entries 331-336, respectively. In one embodiment, data elements 431-436 include info 411-416, respectively. Each of info 411-416 can include information concerning the corresponding cache entries. For example, info 411 can include information (e.g., a pointer) linking data element 431 to cache entry 331. Other types of information can be included as part of info 411-416 without departing from the broader scope and spirit of the present invention.

In one embodiment, data elements 431-436 include timestamps 421-426, respectively. Each of timestamps 421-426 contains the timestamp of when the corresponding cache entry was accessed last. For example, timestamps 421-426 can include timestamps of the last access of cache entries 331-336, respectively. In one embodiment, cache manager 350 uses timestamps 421-426 to determine the (approximate) LRU cache entry for eviction purposes. According to one embodiment, at least some portions of each of data elements 431-436 can be atomically accessed. In at least one embodiment, timestamps 421-426 can each be atomically accessed.

As used herein, an atomic access refers to an access that completes in a single step relative to other threads. When an atomic store (i.e., write) is performed on a shared variable (e.g., timestamps 421-426), no other thread can observe the modification half-complete. When an atomic load (i.e., read) is performed on a shared variable, the thread reads the entire value as it appeared at a single moment in time. Non-atomic accesses do not provide these guarantees. Without these guarantees, lock-free programming would be impossible in systems where multiple threads concurrently access a shared variable. Thus, by providing atomic access to data elements 431-436, which is supported by the hardware via atomic instructions, DDS 341 prevents multiple threads from having to contend for access. From the software point of view, a thread does not have to acquire a software lock. Rather, the hardware (e.g., central processing unit or CPU) provides an atomic access mechanism for such protection, for example, using a "compare-and-swap" instruction supported by the CPU.

Referring now back to FIG. 3. In one embodiment, storage system 304 includes average and standard deviation (ASD) calculator 342. In one embodiment, ASD calculator 342 is operable to calculate a running average and a running standard deviation based on timestamps 421-426 as they are updated. The mathematical computation of an average and standard deviation are well known in the art. For the sake of brevity, it will not be described here. According to one aspect of the invention, cache manager 350 uses ASD calculator 342 and DDS 341 to determine an approximate LRU cache entry for eviction purposes.

In one embodiment, when a thread accesses a cache entry, cache manager 350 locates the corresponding data element in DDS 341. Cache manager 350 then updates the timestamp of the located data element with the timestamp of when the corresponding cache entry was accessed. In one embodiment, in order to determine the approximate LRU cache entry for eviction, cache manager 350 processes one or more data elements of DDS 341 to determine the data element with the smallest, non-zero timestamp among all the processed data elements. Alternatively, cache manager 350 processes one or more data elements of DDS 341 to locate a data element with a timestamp which is non-zero and at least a predetermined number of (e.g., 3) standard deviations from the running average. In one embodiment, one thread can access data element 431, while another thread can access data element 436 of DDS 341 concurrently, without having to acquire a lock for locking the corresponding element. Unlike a single conventional LRU linked list, there is no insertion or removal of data elements in DDS 341, which leads to a very efficient cache management operation.

Throughout the description, the processing of elements to determine an element that is at least a predetermined number of standard deviations from the running average is described in the context of LRU. It shall be understood that the same mechanism is equally applicable to other caching algorithms, including, for example, the least frequently used (LFU) algorithm.

Once the approximately LRU data element is identified, cache manager 350 determines whether the timestamp of the identified data element has changed its value since it was last read, for example, by performing an operation similar to the "compare-and-swap" described above. If the timestamp has not changed value, cache manager 350 updates the timestamp with a zero, for example, by performing the "compare-and-swap" operation to swap the current timestamp with a value of 0 to indicate that the corresponding cache entry is being evicted. Subsequently, cache manager 350 updates the timestamp with the timestamp of when the evicted cache entry was populated.

As described above, conventional implementations of the LRU policy uses a single linked list to represent all the cache entries in the system. Such an implementation can lead to multiple threads contending for access to the single linked list, resulting in an impairment of system performance. According to one aspect of the invention, storage system 304 overcomes this limitation by including multiple linked lists 351A-351B for maintaining information concerning cache 340. Each of linked lists 351A-351B can correspond to one or more of threads 323A-323B that access cache 340. By way of example, linked list 351A can correspond to thread 323A, and linked list 351B can correspond to thread 323B.

By way of further example, linked list 351A and/or linked list 351B can each correspond to multiple of threads 323A-323B.

Figure 5:
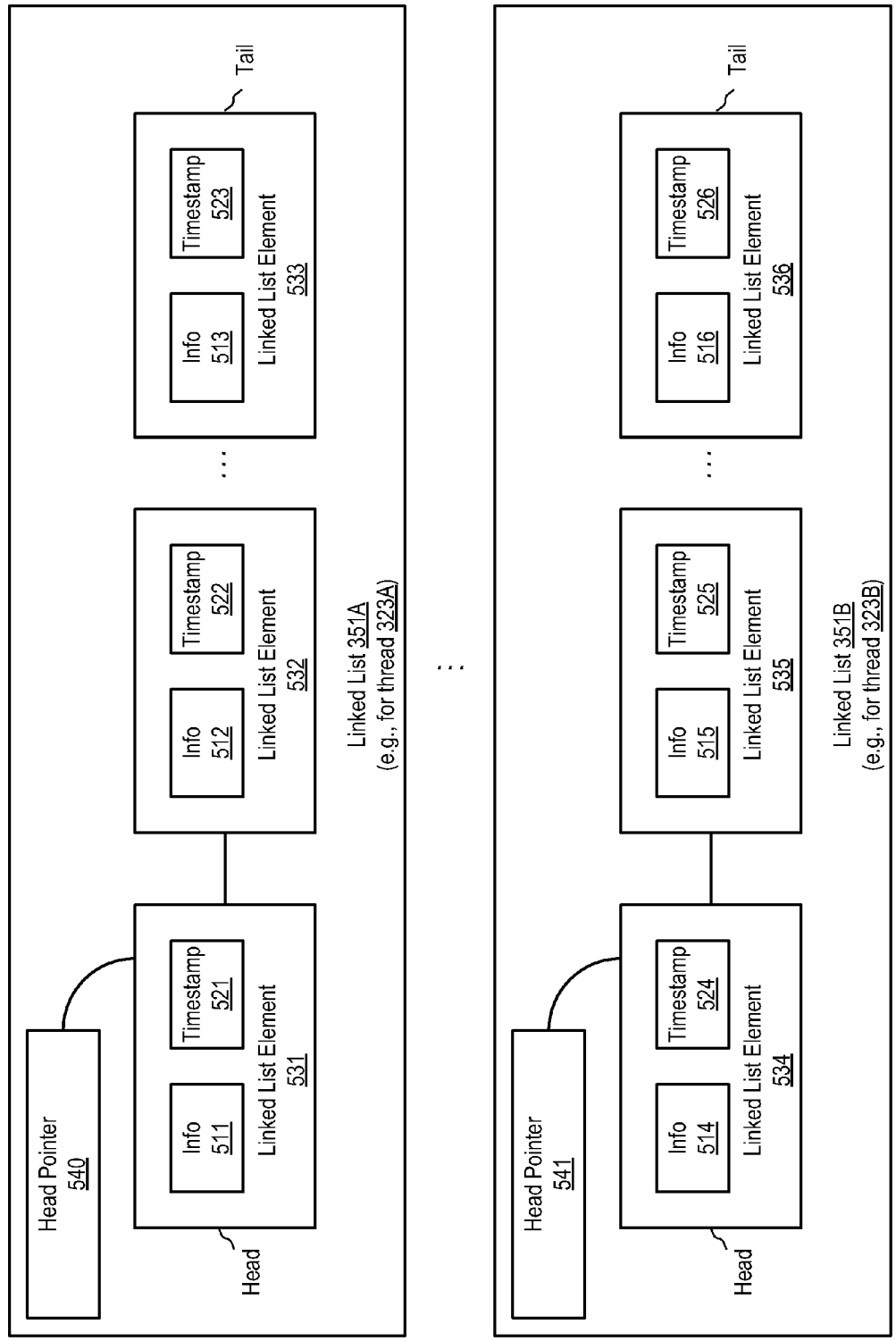
FIG. 5 is a block diagram illustrating multiple linked lists according to one embodiment.

FIG. 5 is a block diagram illustrating multiple linked lists 351A-351B according to one embodiment. Each of the linked lists corresponds to one of the threads accessing the cache. Although two linked lists are illustrated, it shall be understood that more linked lists can be implemented. Linked list 351A is shown, for illustrative purpose and not limitation, as having linked list elements 531-533. Linked list 351B is shown, for illustrative purpose and not limitation, as having linked list elements 534-536. More or less linked list elements can be implemented. In one embodiment, each of linked list elements 531-536 corresponds to a cache entry. For example, linked list elements 531-536 correspond to cache entries 331-336, respectively.

In one embodiment, linked list elements 531-536 include info 511-516, respectively. Each of info 511-516 can include information concerning the corresponding cache entries. For example, info 511 can include information (e.g., a pointer) linking element 531 to cache entry 331. Each of info 511-516 can also include information to link the elements together. For example, info 512 can include information (e.g., a pointer) linking linked list element 532 to next linked list element 533. Info 512 can also include information linking element 532 to previous element 531. Singularly-linked lists, however, only contain within each of its elements information linking it to the next element. For example, if linked list 351A was singularly linked, info 512 would only contain information pointing to next element 533. Each linked list includes a head pointer data structure that contains information (e.g., a pointer) pointing to its head element. In the illustrated example, head pointers 540 and 541 contain information pointing to head elements 531 and 534, respectively.

Each of info 511-516 can also include information indicating whether a corresponding linked list element is locked. For example, info 511 can include information indicating whether linked list element 531 is locked. As used herein, when a linked list element is locked, only the thread which locked it can access the linked list element. Other types of information can be included as part of info 511-516 without departing from the broader scope and spirit of the present invention.

In one embodiment, linked list elements 531-536 include timestamps 521-526, respectively. Each of timestamps 521-526 contains the timestamp of when the corresponding cache entry was accessed last. For example, timestamps 521-526 can include timestamps of the last access of cache entries 331-336, respectively. In one embodiment, cache manager 350 uses timestamps 521-526 to determine the (approximate) LRU cache entry for eviction purposes.

Each of linked lists 351A-351B includes a head element and a tail element. In the illustrated example, linked list elements 531 and 533 are the head and tail elements of linked list 351A, respectively. Linked list elements 534 and 536 are the head and tail elements of linked list 351B, respectively. In one embodiment, the head element corresponds to the MRU cache entry among all cache entries of that linked list, and the tail element corresponds to the LRU cache entry among all cache entries of that linked list. For example, as illustrated, the cache entry corresponding to linked list element 531 is the MRU cache entry among all cache entries corresponding to the elements of linked list 351A, and the cache entry corresponding to linked list element 533 is the LRU cache entry among all cache entries corresponding to the elements of linked list 351A.

Referring now back to FIG. 3. In one embodiment, when a thread accesses a cache entry, cache manager 350 locates the corresponding linked list element in one of linked lists 351A-351B, and moves it to the head of the linked list corresponding to the thread that is accessing the cache entry. A linked list element can be moved from one thread to another/different or same thread. Cache manager 350 then updates the timestamp of the moved linked list element with a timestamp of when the corresponding cache entry was accessed.

In one embodiment, in order to determine the approximate LRU cache entry for eviction, cache manager 350 processes one or more tail elements of linked lists 351A-351B to determine the tail element with the smallest timestamp among the processed tail elements. Once the tail element with the oldest timestamp is identified, the corresponding cache entry is evicted, and new data is populated. Cache manager 350 then moves the identified tail element to the head of the linked list corresponding to the thread that evicted the cache entry. Evicting tail elements are described in further details below.

As described above, a conventional implementation of the LRU policy uses a single linked list. Such an implementation results in a contention for the single linked list whenever multiple threads concurrently access the cache. Embodiments of the present invention overcome this limitation by maintaining multiple linked lists, each corresponding to one of the multiple threads. In this way, contention for the same thread can be minimized.

Throughout the description, each of linked lists 351A-351B is described as corresponding to a single thread. It shall be understood, however, that one or more of linked lists 351A-351B can correspond to multiple threads. For example, storage system 304 may include N threads and M linked lists. In the case where M<N, multiple threads can map to the same linked list. In such an embodiment, the least significant bits of the thread_id can be used to map a thread to the linked list. In such an embodiment, contention for access to the linked lists would still be reduced as compared to a conventional implementation of just a single linked list. It is also possible for M>N (more lists than threads), for example, because one or more threads have exited (i.e., been de-allocated by the system), leaving behind a dead linked list of elements that is not associated with any active thread. According to one embodiment, in such a scenario, cache manager 350 evicts the cache entries corresponding to the elements of the dead linked lists first, even though they may not be the LRU. Alternatively, the cache manager may merge (i.e., link) the dead linked list to a live linked list. For example, a dead linked list may be merged to the tail of a live linked list.

FIGS. 6A-6B are block diagrams illustrating DDS 341 according to one embodiment. DDS 341 includes data elements 431-436, wherein each data element corresponds to a cache entry (e.g., one of cache entries 331-336). In FIGS. 6A-6B, each data element is shown with a letter followed by a colon and a number (e.g., "A:10"). Here, the letter represents the content currently stored at the corresponding cache entry, and the number represents the timestamp of when the corresponding cache entry was last accessed. Thus, in the example "A:10", the data element corresponds to a cache entry which contains content "A", which was accessed at time "10". As illustrated in FIG. 6A, data elements 431-436 contain the content:timestamps of A:10, B:9, C:7, D:5, E:3, and F:1, respectively.

Referring now to FIG. 6B, which illustrates multiple threads concurrently accessing DDS 341. In the illustrated example, cache manager 350 receives a request from a first thread (e.g., thread 323A) to access content C at time 11, which is stored at the cache entry corresponding to data element 433. Thus, cache manager 350 atomically updates data element 433 with the timestamp of when the cache entry was accessed (i.e., 11). In this example, cache manager 350 also receives a request from a second thread (e.g., thread 323B) to write content G. In response to determining there is no available cache entry, cache manager 350 determines the cache entry corresponding to data element 436 is the LRU. Accordingly, cache manager 350 evicts content F from the cache entry corresponding to data element 436 and stores content G at time 11. Thus, cache manager 350 atomically updates data element 436 with the timestamp of when the cache entry was populated (i.e., 11). The updating of DDS 341 by the two threads can occur simultaneously without requiring either thread to wait for the other.

Figure 7:
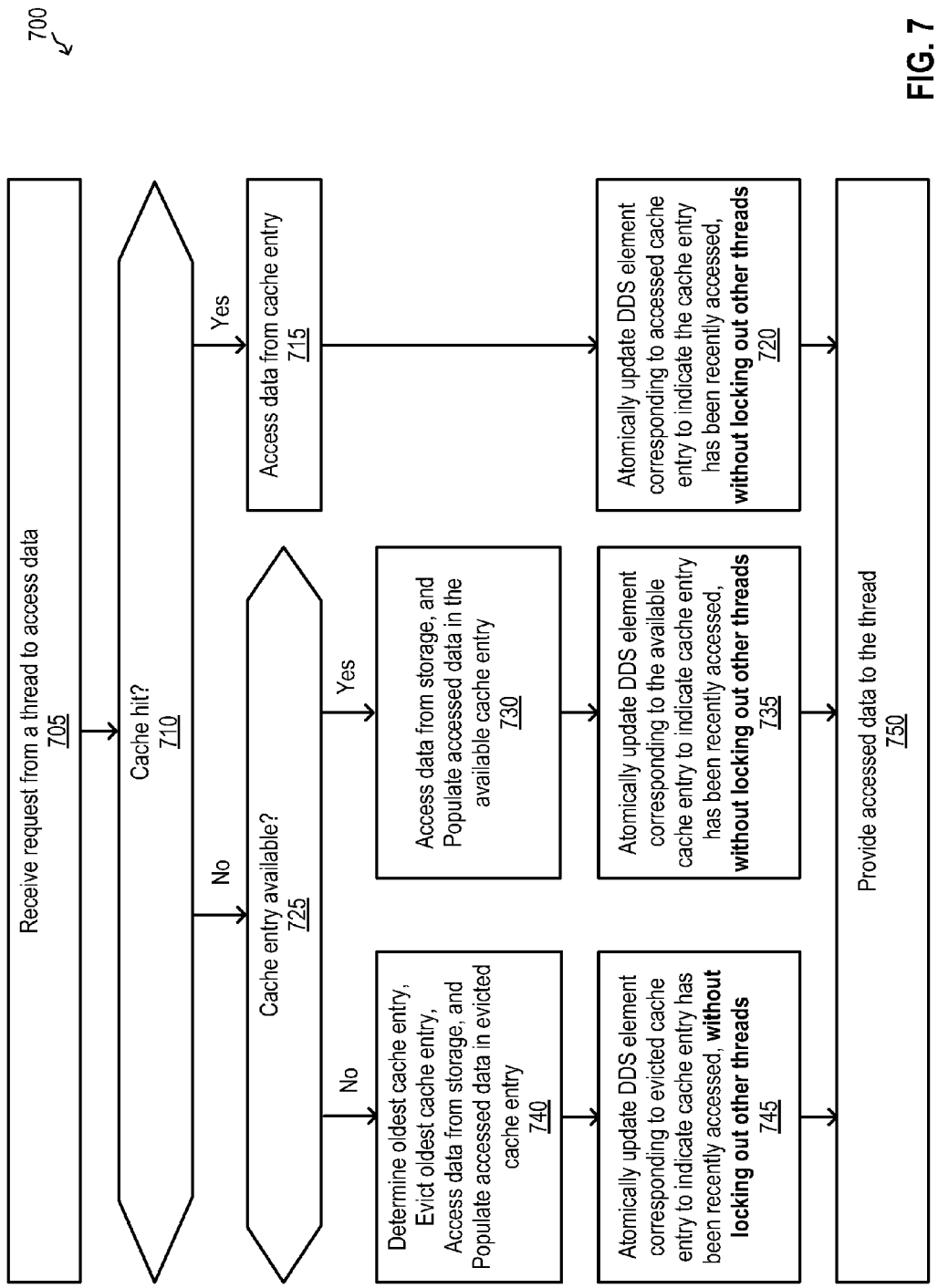
FIG. 7 is a flow diagram illustrating a method for implementing the LRU policy according to one embodiment.

FIG. 7 is a flow diagram illustrating method 700 for minimizing contention when performing cache eviction in a multi-threaded system. For example, method 700 can be performed by cache manager 350, which can be implemented as software, firmware, hardware, or any combination thereof. The operations of this and other flow diagrams will be described with reference to the exemplary embodiments of the other diagrams. However, it should be understood that the operations of the flow diagrams can be performed by embodiments of the invention other than those discussed with reference to these other diagrams, and the embodiments of the invention discussed with reference to these other diagrams can perform operations different than those discussed with reference to the flow diagrams. FIG. 7 will now be described with reference to the example illustrated in FIGS. 6A-6B.

Referring now to FIG. 7. At block 705, cache manager 350 receives a request from a thread to access data. For example, cache manager 350 receives a request from thread 323A to access content C at time 11. At block 710, cache manager 350 determines whether there is a cache hit. At block 715, in response to determining there is a cache hit, cache manager 350 accesses data from the cache entry containing the requested data. For example, cache manager 350 determines that content C is currently stored at the cache entry corresponding to data element 433, and access content C from the cache entry. At block 720, cache manager 350 atomically updates the DDS element corresponding to the accessed cache entry to indicate the cache entry has been recently accessed, without locking out other threads. For example, cache manager 350 atomically updates accessed data element 433 with a timestamp of 11 without preventing evicted data element 436 from being concurrently updated with a timestamp of 12.

Returning now back to block 710. In response to determining there is no cache hit, cache manager 350 transitions from block 710 to block 725 and determines whether a cache entry is available for use. At block 730, in response to determining a cache entry is available, cache manager 350 accesses the requested data from storage and populates the requested data in the available cache entry. At block 735, cache manager 350 atomically updates the DDS element corresponding to the newly populated cache entry to indicate the cache entry has been recently accessed, without locking out other threads.

Referring now back to block 725. In response to determining there is no cache entry available to cache the requested data, cache manager 350 transitions to block 740. At block 740, cache manager 350 determines the oldest cache entry and evicts it. As part of block 740, cache manager 350 accesses the requested data from storage and populates the requested data in the evicted cache entry. At block 745, cache manager 350 atomically updates the DDS element corresponding to the evicted cache entry to indicate the cache entry has been recently accessed, without locking out other threads. At block 750, the cache manager provides the accessed data to the requesting thread.

Figure 8:
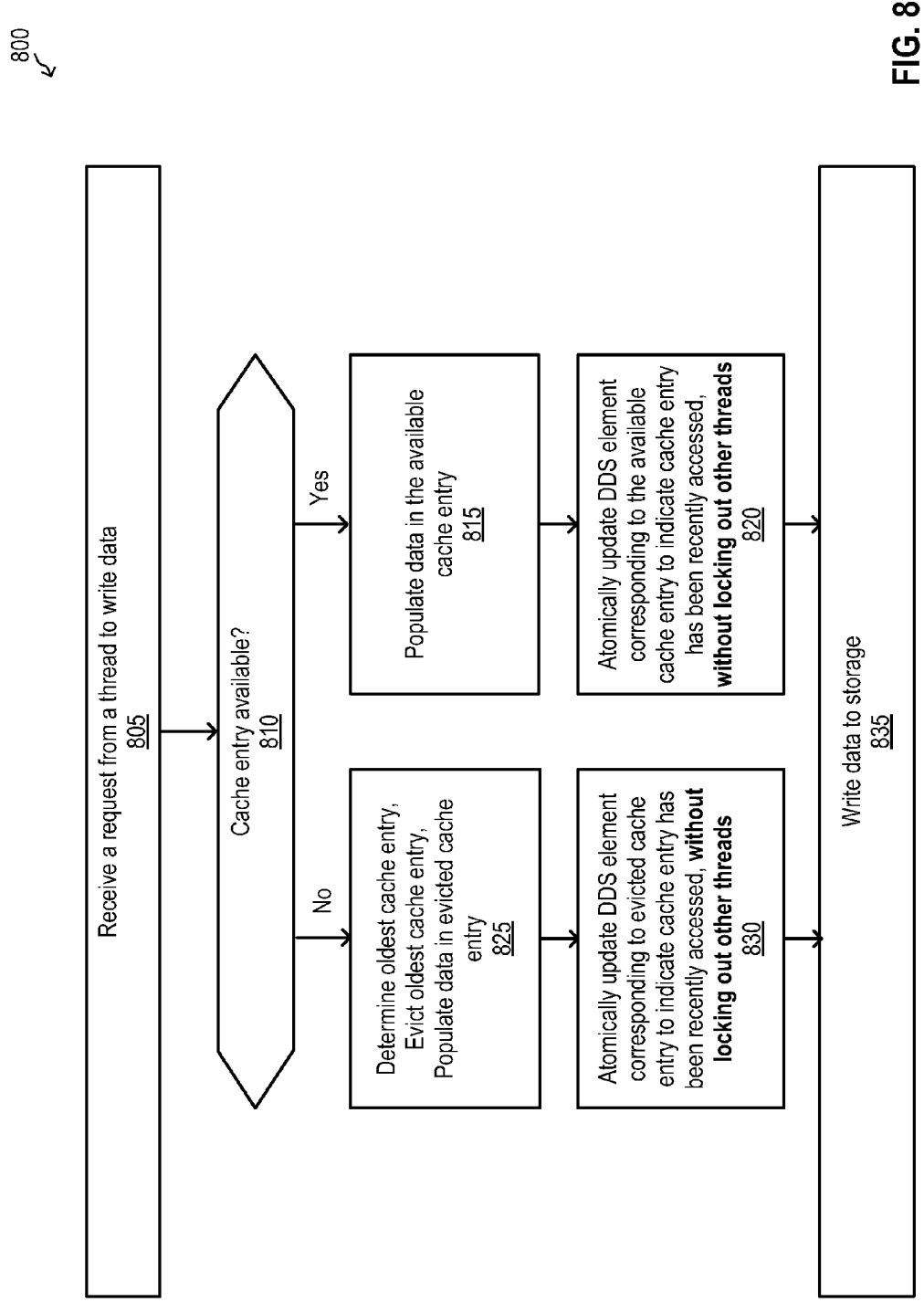
FIG. 8 is a flow diagram illustrating a method for implementing the LRU policy according to one embodiment.

FIG. 8 is a flow diagram illustrating method 800 for minimizing contention when performing cache eviction in a multi-threaded system. For example, method 800 can be performed by cache manager 350, which can be implemented as software, firmware, hardware, or any combination thereof. FIG. 8 will now be described with reference to the example illustrated in FIGS. 6A-6B. At block 805, cache manager 350 receives a request from a thread to write data to storage. For example, cache manager 350 receives a request from thread 323B to write content G at time 12. At block 810, cache manager 350 determines whether there is an available cache entry to cache the write data. At block 815, in response to determining there is an available cache entry, cache manager 350 populates the write data in the available cache entry. At block 820, cache manager 350 atomically updates the DDS element corresponding to the available (and newly populated) cache entry to indicate the cache entry has been recently accessed, without locking out other threads.

Returning now back to block 810. In response to determining there is no cache entry available, cache manager 350 transitions to block 825. At block 825, cache manager 350 determines the oldest cache entry, and evicts it. For example, cache manager 350 determines the cache entry corresponding to data element 436 is the LRU and evicts it. As part of block 825, cache manager 350 populates the write data in the evicted cache entry. For example, cache manager 350 evicts content F from the cache entry corresponding to data element 436, and populates the cache entry with content G at time 12.

At block 830, cache manager 350 atomically updates the DDS element corresponding to the evicted cache entry to indicate the cache entry has been recently accessed, without locking out other threads. For example, cache manager 350 updates evicted data element 436 with a timestamp of 12 without preventing data element 433 from being concurrently updated with a timestamp of 11. At block 835, cache manager 350 writes the data to storage.

Figure 9:
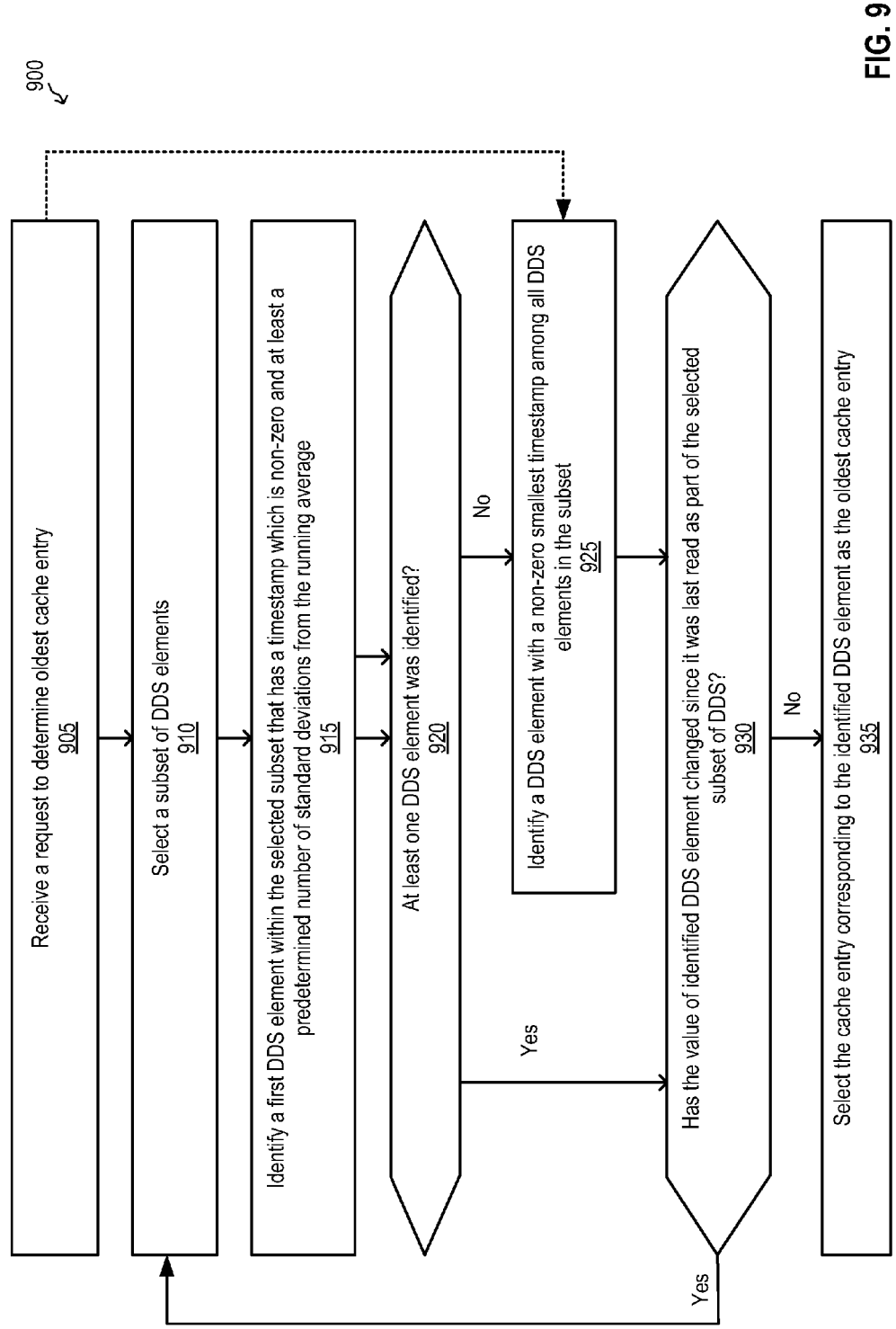
FIG. 9 is a flow diagram illustrating a method for determining an approximately LRU cache entry according to one embodiment.

FIG. 9 is a flow diagram illustrating method 900 for determining an approximately LRU cache entry according to one embodiment. For example, method 900 can be performed by cache manager 350, which can be implemented in software, firmware, hardware, or any combination thereof. The operations of method 900, for example, can be performed as part of blocks 740 and 825 of FIGS. 7 and 8, respectively.

Referring now to FIG. 9, at block 905, cache manager 350 receives a request to determine an oldest cache entry. At block 910, cache manager 350 selects a subset of the DDS elements. In one embodiment, cache manager 350 selects a subset of DDS elements which contains at least one DDS element which was not included in a subset of DDS previously selected. By selecting only a subset of the DDS to process, cache manager 350 reduces the amount of time required to determine the oldest cache entry. The identified cache entry may not, however, be truly the oldest (i.e., LRU) cache entry. Rather, the identified cache entry may only be an approximately LRU cache entry.

At block 915, cache manager 350 identifies a first DDS element within the selected subset that has a timestamp which is non-zero and at least a predetermined number of standard deviations from the running average. At block 920, cache manager 350 determines whether at least one DDS element was identified from the subset which has a timestamp that is non-zero and at least a predetermined number of standard deviations from the running average. If so, at block 930, cache manager 350 determines whether the timestamp of the identified DDS element has changed value since it was last read as part of the selected subset of DDS. If the timestamp has changed value, cache manager 350 returns to block 910 to select another subset of DDS. Otherwise, cache manager 350 transitions from block 930 to block 935. At block 935, cache manager 350 selects the cache entry corresponding to the identified DDS element as the approximately LRU cache entry.

At block 925, in response to determining none of the DDS elements of the selected subset has a timestamp which is non-zero and at least a predetermined number of standard deviations from the running average, cache manager 350 identifies a DDS element with a non-zero and smallest timestamp among all DDS elements of the subset. Cache manager 350 selects the cache entry corresponding to the DDS element with a non-zero and smallest timestamp as the approximately LRU cache entry. Cache manager 350 then transitions from block 925 to block 930 to perform operations as described above.

In an alternate embodiment, cache manager 350 may determine the approximately LRU cache entry by simply transitioning from block 905 to block 925. In other words, cache manager 350 does not attempt to determine the approximately LRU cache entry by first identifying a DDS element which has a timestamp that is non-zero and at least a predetermined number of standard deviations from the running average. Also, it should be generally understood that steps 915 and steps 925 can be processed concurrently.

Figure 10:
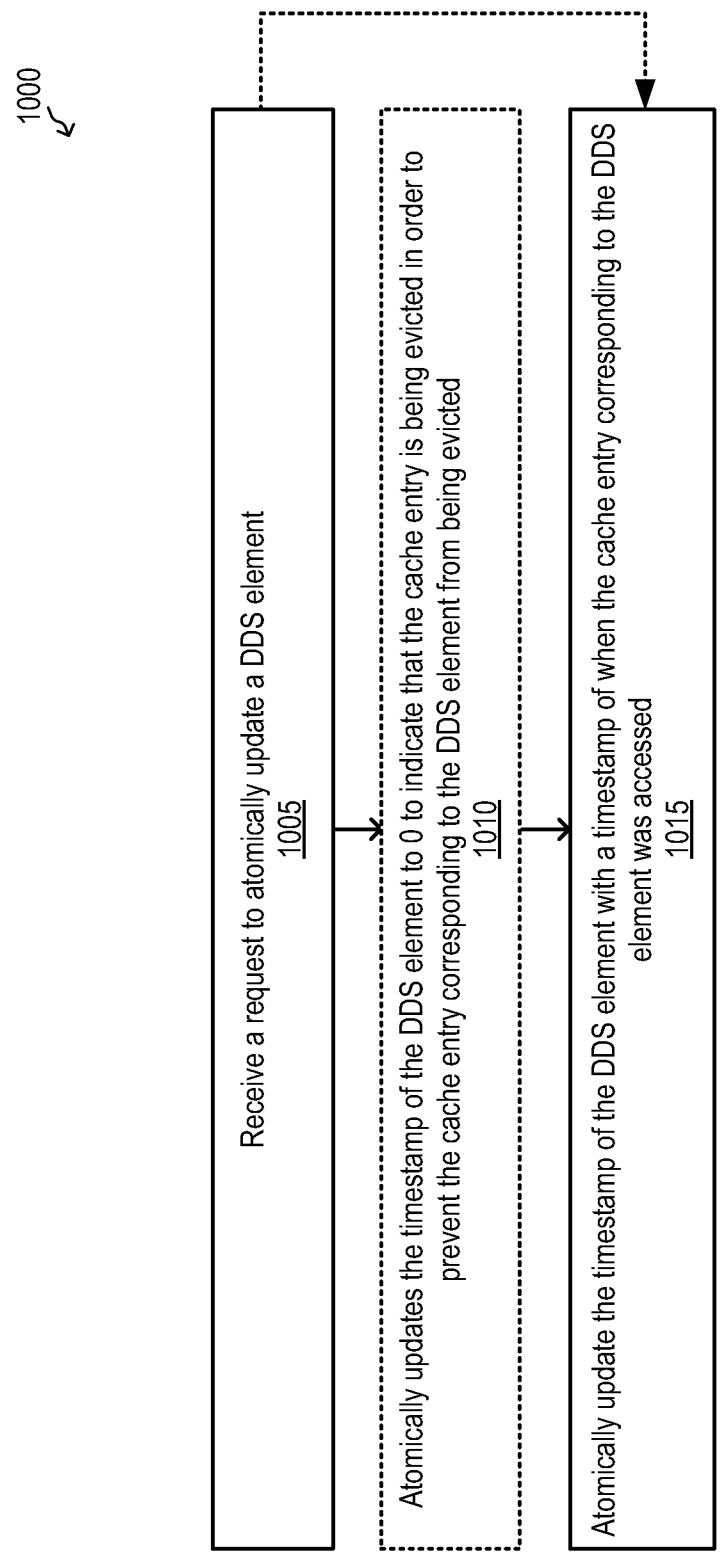
FIG. 10 is a flow diagram illustrating a method for atomically updating a DDS data element according to one embodiment.

FIG. 10 is a flow diagram illustrating method 1000 for updating a DDS element to indicate a corresponding cache entry has recently been accessed, according to one embodiment. For example, method 1000 can be performed by cache manager 350, which can be implemented in software, firmware, hardware, or any combination thereof. The operations of method 1000, for example, can be performed as part of blocks 720, 735, 745 of FIG. 7, and blocks 820 and 830 of FIG. 8.

Referring now to FIG. 10, at block 1005, cache manager 350 receives a request to atomically update a DDS element. At optional block 1010, cache manager 350 atomically updates the timestamp of the DDS element to zero to indicate that the cache entry is being evicted in order to prevent the cache entry corresponding to the DDS element from being evicted by another thread. At block 1015, cache manager 350 atomically updates the timestamp of the DDS element with a timestamp of when the cache entry corresponding to the DDS element was inserted or accessed.

In one embodiment, in the case where the DDS element is not being evicted, optional block 1010 is not performed. For example, in the case where the DDS element is being updated after its corresponding cache entry has been read from, cache manager 350 may simply perform the operations of block 1015 without performing the operations of block 1010.

Figure 11:
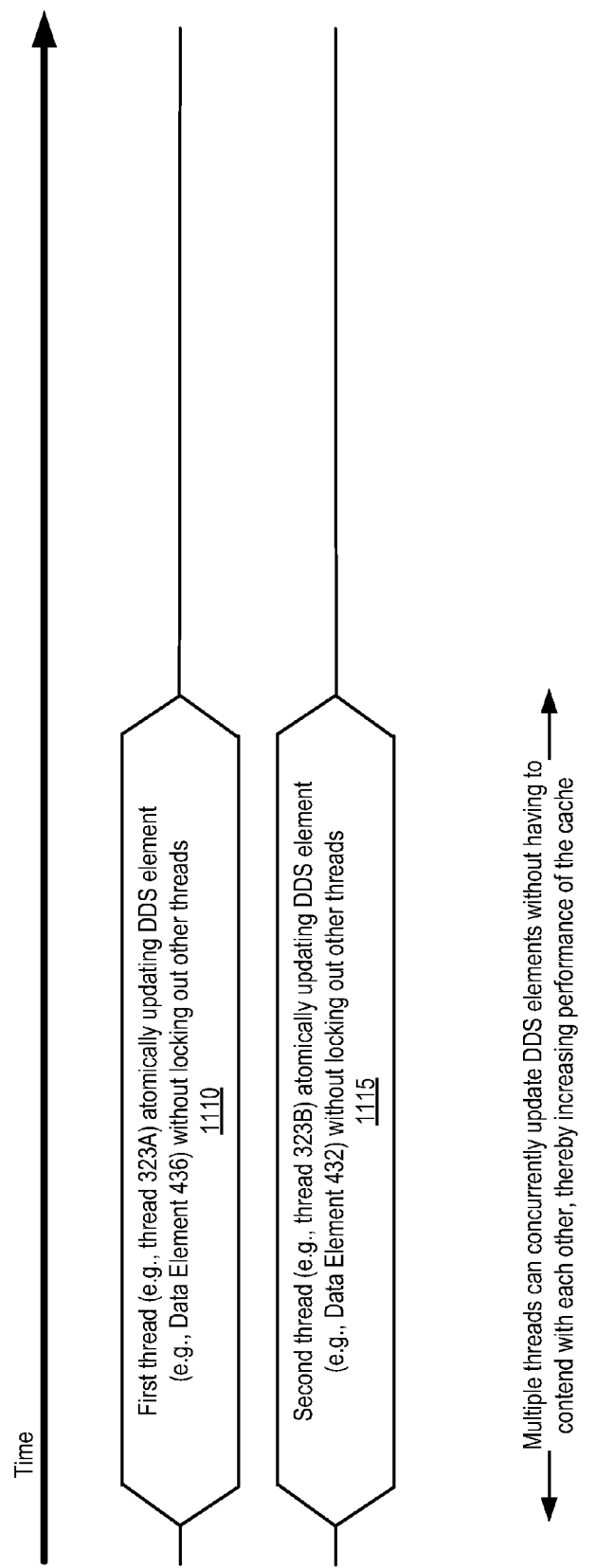
FIG. 11 is a timing diagram illustrating multiple threads accessing a DDS without contention according to one embodiment.

FIG. 11 is a timeline diagram illustrating multiple threads accessing the DDS without contention according to one embodiment. During time period 1110, a first thread atomically updates a DDS element without locking out other threads. During time period 1115, a second thread atomically updates a DDS element without locking out other threads.

The DDS elements updated by the first and second thread may be the same or different DDS elements. In one embodiment, time periods 1110 and 1115 overlap, i.e., the first and second thread can concurrently and atomically update the DDS elements. In this way, the threads are not stalled, and system performance is enhanced.

FIGS. 12A-12B are block diagrams illustrating linked lists 351A-351B according to one embodiment. Linked lists 351A-351B include linked list elements 531-538, wherein each linked list element corresponds to a cache entry. In FIGS. 12A-12B, each linked list element is shown with a letter followed by a colon and a number (e.g., "A:10"). Here, the letter represents the content currently stored at the corresponding cache entry, and the number represents the timestamp of when the corresponding cache entry was last accessed. Thus, in the example "A:10", the linked list element corresponds to a cache entry which contains content "A", which was accessed at time "10". As illustrated in FIG. 12A, linked list elements 531-538 contain the content: timestamps of A:10, B:9, C:7, D:6, E:5, F:4, G:3, and H:2, respectively.

In the example illustrated in FIG. 12A, linked list 351A corresponds to thread 323A, and linked list 351B corresponds to thread 323B. Linked list elements 531 and 534 are the head and tail elements of linked list 351A, respectively. Linked list elements 535 and 538 are the head and tail elements of linked list 351B, respectively.

Referring now to FIG. 12B, which illustrates multiple threads concurrently accessing linked lists 351A-351B. In the illustrated example, cache manager 350 receives a request from a first thread (e.g., thread 323B) to access content C at time 11, which is stored at the cache entry corresponding to data element 533. In one embodiment, cache manager 350 locks linked list element 533, adjacent linked list elements 532 and 534, and head pointer 541 to prevent other threads from updating the respective elements. Cache manager 350 removes element 533 from linked list 323A and inserts it at the head of linked list 351B. Cache manager 350 updates linked list element 533 with the timestamp of when the cache entry was accessed (i.e., 11). Cache manager 350 links element 533 to element 535, updates head pointer 541 with information pointing to the new head element (i.e., element 533), and unlocks head pointer 541. Cache manager 350 then relinks and unlocks adjacent elements 532 and 534.

In this example, cache manager 350 also receives a request from a second thread (e.g., thread 323A) to write content I at time 11. In response to determining there is no available cache entry, cache manager 350 determines the cache entry corresponding to data element 538 is the LRU and evicts its corresponding cache entry. In one embodiment, cache manager 350 locks linked list element 538, adjacent linked list element 537, and head pointer 540 to prevent other threads from updating the respective elements. Cache manager 350 removes element 538 from linked list 323B and inserts it at the head of linked list 351A. Cache manager 350 updates linked list element 538 with the timestamp of when the cache entry was populated (i.e., 11). Cache manager 350 links element 538 to element 531, updates head pointer 540 with information pointing to the new head element (i.e., element 538), and unlocks head pointer 540. Cache manager 350 then relinks and unlocks adjacent element 537. The element locking mechanism described above assumes that linked lists 351A and 351B are not singularly linked. In the case where linked lists 351A and 351B were singularly linked, only the target linked list element and its previous element are locked. The next element, however, is not locked. By way of example, if linked list 351A was singularly linked, element 534 would not be locked when element 533 is being updated. The updating of linked lists 351A and 351B in the above example by the two threads can occur simultaneously without requiring either thread to wait for the other. Thus, contrary to a conventional implementation of the LRU policy, threads are not stalled.

Note that although there may be more locks in the present invention, the probability of contention is still lower than a conventional LRU implementation because the threads are not stalled unless they are accessing the same data. In the above example, other threads would be stalled only if they access content A, B, D, E, or G in cache entries corresponding to linked list elements 531, 532, 534, 535, and 537, respectively. The probability of threads accessing the same data is low. It may appear that elements 531, 532, 534, 535, and 537 make up the majority of linked lists 351A and 351B, and thus, it may appear that the probability of contention is high. It shall be noted, however, that linked lists 351A and 351B may comprise of many more elements than illustrated. Thus, the probability of multiple threads contending for the same elements is quite low in practice. In contrast, under the conventional single linked list approach, all threads are stalled whenever any single thread is accessing any content in any cache entry in the system because there is only one single linked list.

Figure 13:
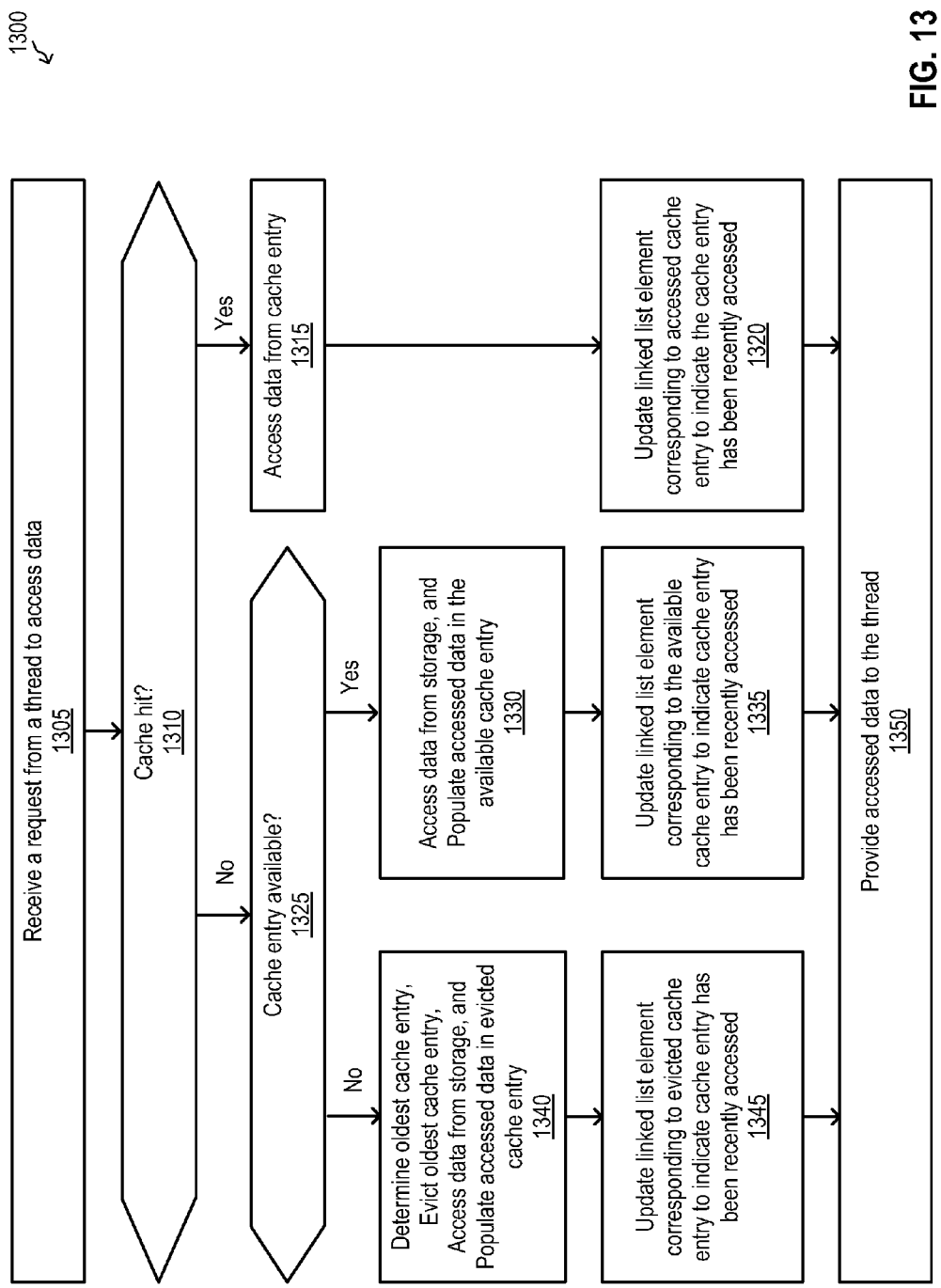
FIG. 13 is a flow diagram illustrating a method for implementing the LRU policy according to one embodiment.

FIG. 13 is a flow diagram illustrating method 1300 for minimizing contention when performing cache eviction in a multi-threaded system. For example, method 1300 can be performed by cache manager 350, which can be implemented as software, firmware, hardware, or any combination thereof. FIG. 13 will now be described with reference to the example illustrated in FIG. 12A-12B.

Referring now to FIG. 13. At block 1305, cache manager 350 receives a request from a thread to access data. For example, cache manager 350 receives a request from thread 323B to access content C at time 11. At block 1310, cache manager 350 determines whether there is a cache hit. At block 1315, in response to determining there is a cache hit, cache manager 350 accesses data from the cache entry containing the requested data. For example, cache manager 350 accesses content C from cache entry corresponding to linked list element 533. At block 1320, cache manager 350 updates the linked list element corresponding to the accessed cache entry to indicate the cache entry has been recently accessed. For example, cache manager 350 updates accessed linked list element 533 with a timestamp of 11.

Returning now back to block 1310. In response to determining there is no cache hit, cache manager 350 transitions from block 1310 to block 1325 and determines whether a cache entry is available for use. At block 1330, in response to determining a cache entry is available, cache manager 350 accesses the requested data from storage and populates the requested data in the available cache entry. At block 1335, cache manager 350 updates the linked list element corresponding to the newly populated cache entry to indicate the cache entry has been recently accessed.

Referring now back to block 1325. In response to determining there is no cache entry available to cache the requested data, cache manager 350 transitions to block 1340. At block 1340, cache manager 350 determines the oldest cache entry and evicts it. As part of block 1340, cache manager 350 accesses the requested data from storage and populates the requested data in the evicted cache entry. At block 1345, cache manager 350 updates the linked list element corresponding to the evicted cache entry to indicate the cache entry has been recently accessed. At block 1350, cache manager 350 provides the requested data to the thread.

Figure 14:
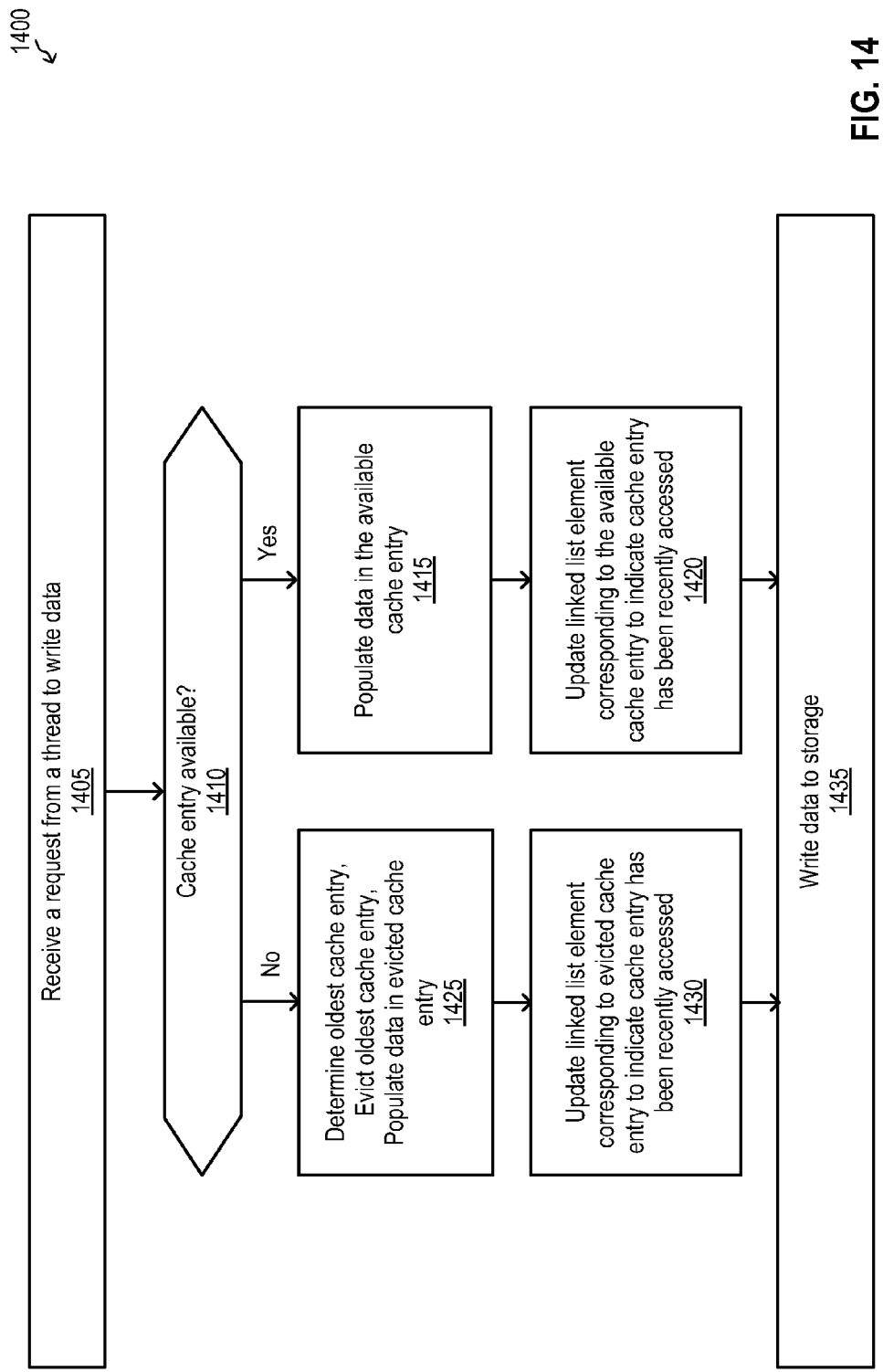
FIG. 14 is a flow diagram illustrating a method for implementing the LRU policy according to one embodiment.

FIG. 14 is a flow diagram illustrating method 1400 for minimizing contention when performing cache eviction in a multi-threaded system. For example, method 1400 can be performed by cache manager 350, which can be implemented as software, firmware, hardware, or any combination thereof. FIG. 14 will now be described with reference to the example illustrated in FIG. 12A-12B. At block 1405, cache manager 350 receives a request from a thread to write data to storage. For example, cache manager 350 receives a request from thread 323A to write content I at time 12. At block 1410, cache manager 350 determines whether there is an available cache entry to cache the write data. At block 1415, in response to determining there is an available cache entry, cache manager 350 populates the write data in the available cache entry. At block 1420, cache manager 350 updates the linked list element corresponding to the available (and newly populated) cache entry to indicate the cache entry has been recently accessed.

Returning now back to block 1410. In response to determining there is no cache entry available, cache manager 350 transitions to block 1425. At block 1425, cache manager 350 determines the oldest cache entry, and evicts it. For example, cache manager 350 determines the cache entry corresponding to linked list element 538 is the (approximate) LRU and evicts it. As part of block 1425, cache manager 350 populates the write data in the evicted cache entry. For example, cache manager 350 evicts content H from the cache entry corresponding to linked list element 538, and populates the cache entry with content I at time 12.

At block 1430, cache manager 350 updates the linked list element corresponding to the evicted cache entry to indicate the cache entry has been recently accessed. For example, cache manager 350 updates evicted linked list element 538 with a timestamp of 12 without preventing linked list element 533 from being concurrently updated with a timestamp of 11. At block 1435, cache manager 350 writes the data to storage.

Figure 15:
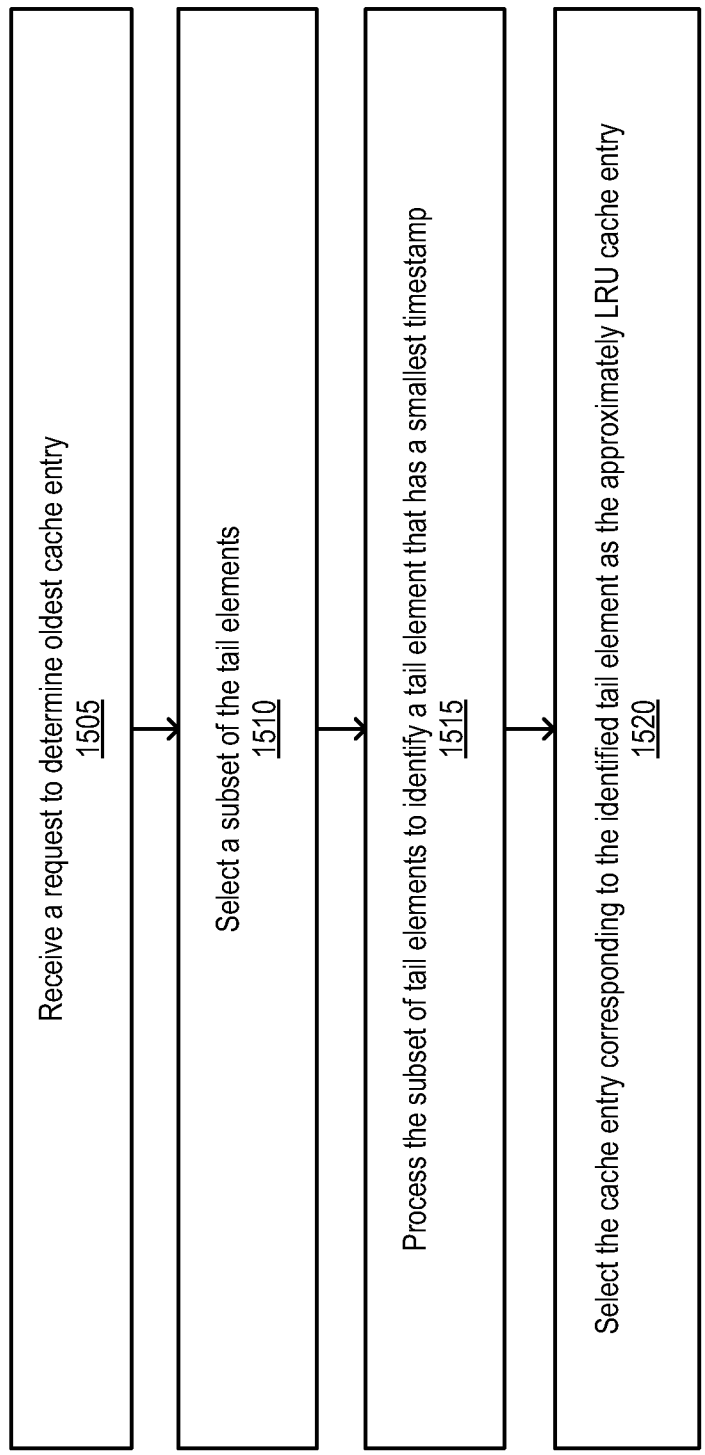
FIG. 15 is a flow diagram illustrating a method for determining an approximately LRU cache entry according to one embodiment.

FIG. 15 is a flow diagram illustrating method 1500 for determining an approximately LRU cache entry according to one embodiment. For example, method 1500 can be performed by cache manager 350, which can be implemented in software, firmware, hardware, or any combination thereof. The operations of method 1500, for example, can be performed as part of blocks 1340 and 1425 of FIGS. 13 and 14, respectively.

Referring now to FIG. 15, at block 1505, cache manager 350 receives a request to determine an oldest cache entry. At block 1510, cache manager 350 selects a subset of the tail elements. In one embodiment, cache manager 350 selects a subset of tail elements which contains at least one tail element which was not included in a subset of tail elements previously selected. By selecting only a subset of the tail elements to process, cache manager 350 reduces the amount of time required to determine the oldest cache entry. The identified cache entry may not, however, be truly the oldest (i.e., LRU) cache entry. Rather, the identified cache entry may only be an approximately LRU cache entry. At block 1515, cache manager 350 processes the selected subset of tail elements to identify a tail element that has a smallest timestamp. At block 1520, cache manager 350 selects the cache entry corresponding to the identified tail element as the approximately LRU cache entry.

Figure 16:
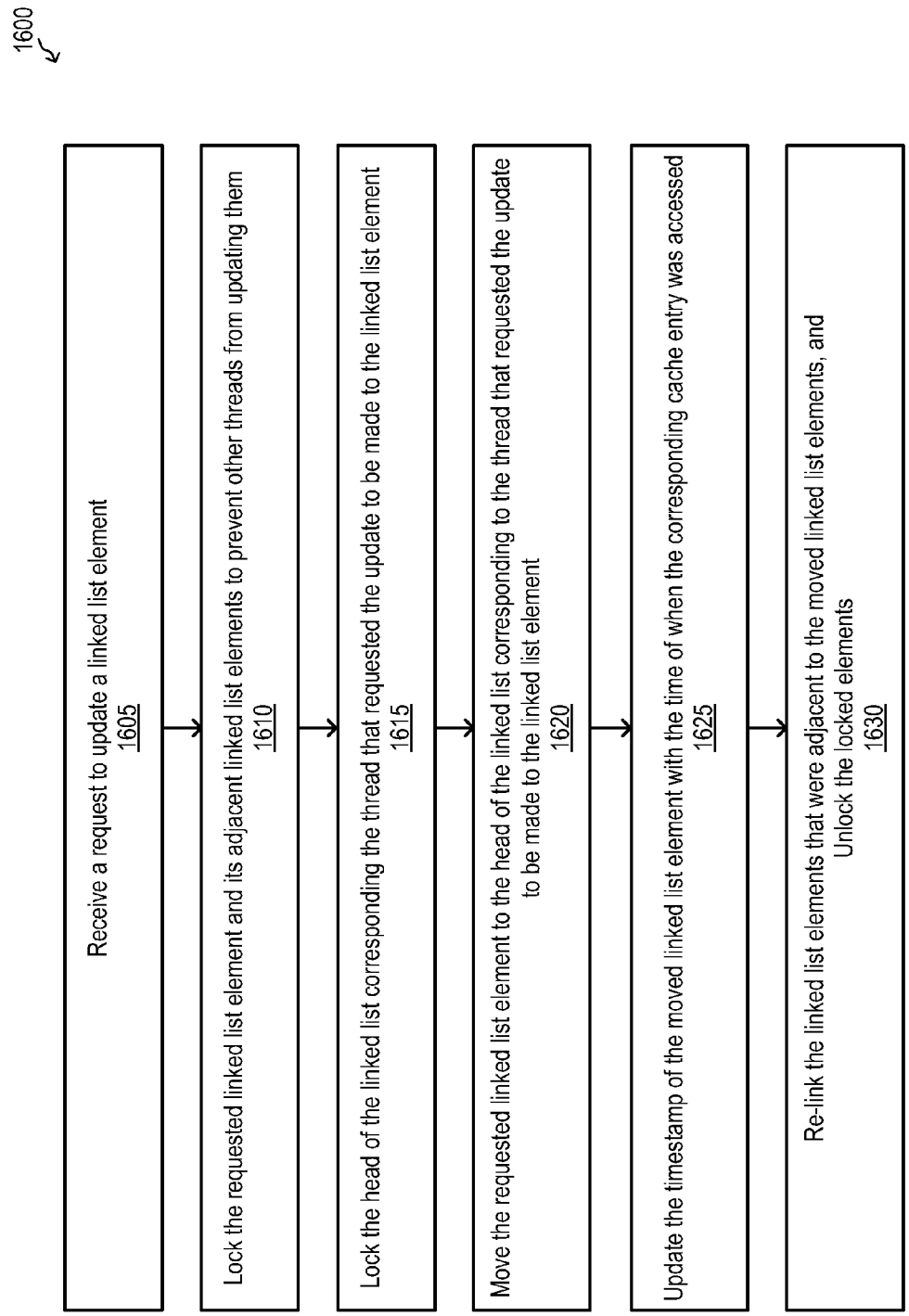
FIG. 16 is a flow diagram illustrating a method for updating a linked list element according to one embodiment.

FIG. 16 is a flow diagram illustrating method 1600 for updating a linked list element to indicate a corresponding cache entry has recently been accessed, according to one embodiment. For example, method 1600 can be performed by cache manager 350, which can be implemented in software, firmware, hardware, or any combination thereof. The operations of method 1600, for example, can be performed as part of blocks 1320, 1335, 1345 of FIG. 13, and blocks 1420 and 1430 of FIG. 14. FIG. 16 will now be described with reference to the example illustrated in FIGS. 12A-12B.

Referring now to FIG. 16, at block 1605, cache manager 350 receives a request to update a linked list element. For example, cache manager 350 receives a request from thread 351B to update linked list element 533, or a request from thread 351A to update linked list element 538. At block 1610, cache manager 350 locks the requested linked list element and its adjacent linked list elements to prevent other threads from updating them. For example, in response to a request from thread 351B to update linked list element 533, cache manager 350 locks adjacent elements 532 and 534 of linked list 351A. By way of further example, in response to a request from thread 351A to update linked list element 538, cache manager 350 locks adjacent element 537 of linked list 351B.

At block 1615, cache manager 350 locks the head of the linked list corresponding to the thread that requested the update to be made to the linked list element. For example, in response to the request from thread 323A, cache manager 350 locks head element 531. By way of further example, in response to the request from thread 323B, cache manager 350 locks head element 535. At block 1620, cache manager 350 moves the requested linked list element to the head of the linked list corresponding to the thread that requested the update to be made to the linked list element. For example, in response to the request from thread 323A, cache manager 350 moves linked list element 538 from linked list 351B to the head of linked list 351A. By way of further example, in response to the request from thread 323B, cache manager 350 moves linked list element 533 from linked list 351A to the head of linked list 351B.

At block 1625, cache manager 350 updates the timestamp of the moved linked list element with the time of when the corresponding cache entry was accessed. For example, cache manager 350 updates timestamp of linked list element 533 with a timestamp of 11, and updates the timestamp of linked list element 538 with a timestamp of 12. At block 1630, cache manager 350 re-links the linked list elements that were adjacent to the moved linked list elements, and unlocks the locked linked list elements in order to allow other threads to update them. For example, cache manager 350 unlocks linked list elements 531, 532, 533, 534, 535, 537, and 538.

Figure 17:
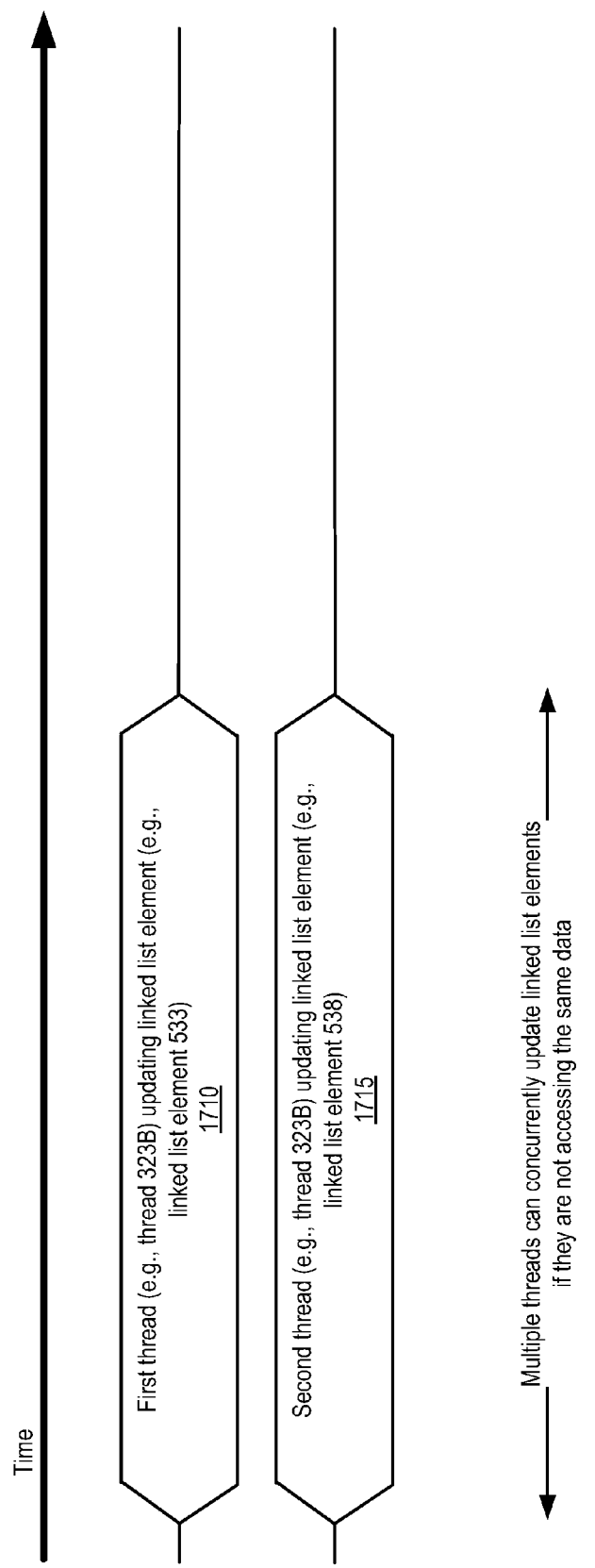
FIG. 17 is a timing diagram illustrating multiple threads accessing multiple linked lists without contention according to one embodiment.

FIG. 17 is a timeline diagram illustrating multiple threads accessing the linked lists without contention according to one embodiment. During time period 1710, a first thread updates a linked list element. During time period 1715, a second thread updates another linked list element. In one embodiment, time periods 1710 and 1715 overlap, i.e., the first and second thread can concurrently update the linked list elements. In this way, the threads are not stalled, and system performance is enhanced.

Throughout the description, embodiments of the present invention have been described in the context of LRU. One having ordinary skill in the art would recognize, however, that the invention is not so limited. For example, the embodiments described herein can be extended to any type of sorted list, including but not limited to, MRU.

Figure 18:
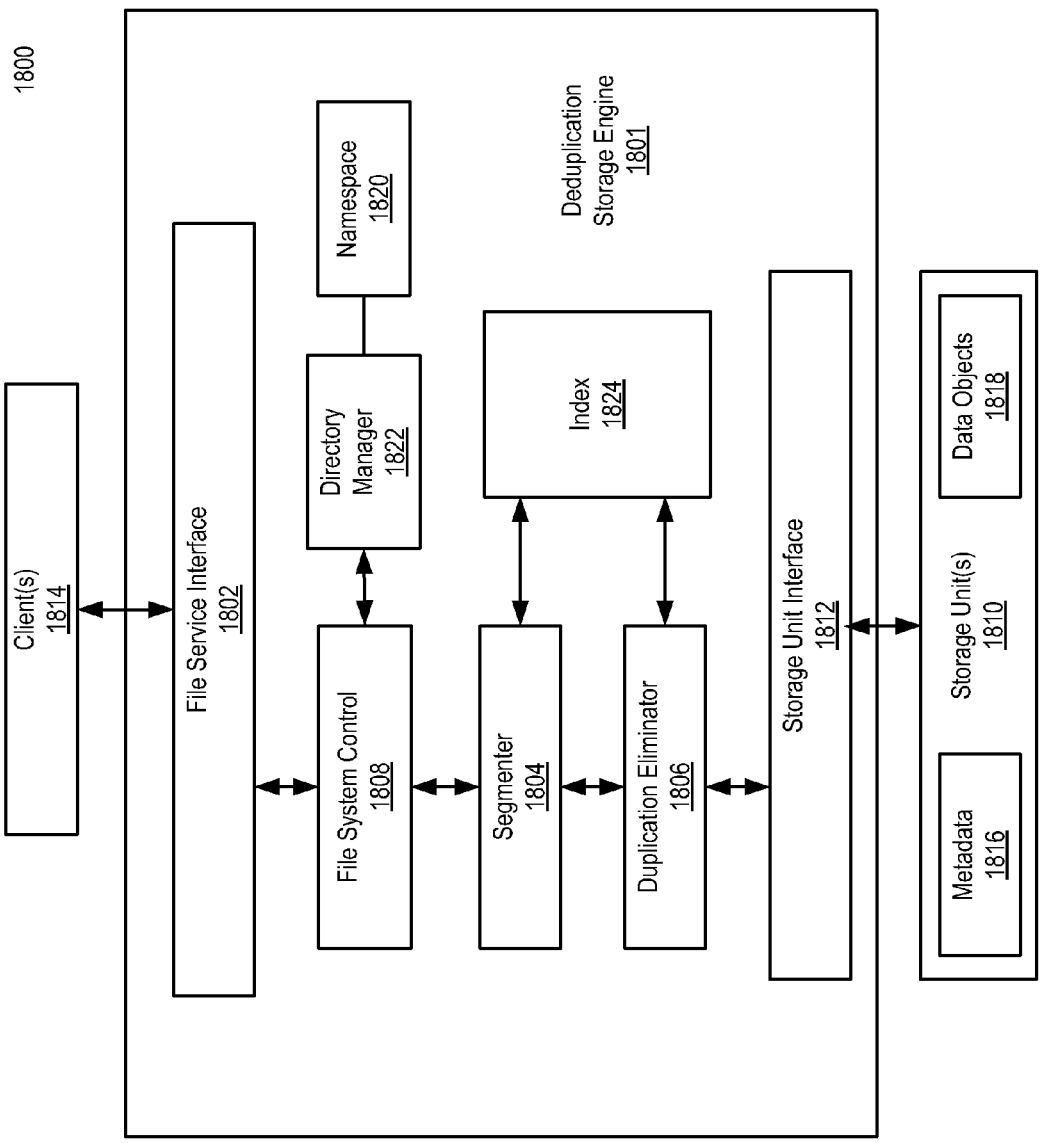
FIG. 18 is a block diagram illustrating a deduplication storage engine which can be used with embodiments of the invention.

FIG. 18 is a block diagram illustrating a deduplication storage system according to one embodiment of the invention. For example, deduplication storage system 1800 may be implemented as part of a deduplication storage system as described above, such as, for example, the deduplication storage system as shown in FIG. 1. In one embodiment, storage system 1800 may represent a file server (e.g., an appliance used to provide network attached storage (NAS) capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Storage system 1800 may have a distributed architecture, or all of its components may be integrated into a single unit. Storage system 1800 may be implemented as part of an archive and/or backup system such as a deduplicating storage system available from EMC® Corporation of Hopkinton, Mass.

In one embodiment, storage system 1800 includes a deduplication engine 1801 interfacing one or more clients 1814 with one or more storage units 1810 storing metadata 1816 and data objects 1818. Clients 1814 may be any kinds of clients, such as, for example, a client application, backup software, or a garbage collector, located locally or remotely over a network. A network may be any type of networks such as a local area network (LAN), a wide area network (WAN) such as the Internet, a corporate intranet, a metropolitan area network (MAN), a storage area network (SAN), a bus, or a combination thereof, wired and/or wireless.

Storage devices or units 1810 may be implemented locally (e.g., single node operating environment) or remotely (e.g., multi-node operating environment) via an interconnect, which may be a bus and/or a network. In one embodiment, one of storage units 1810 operates as an active storage to receive and store external or fresh user data, while the another one of storage units 1810 operates as a target storage unit to periodically archive data from the active storage unit according to an archiving policy or scheme. Storage units 1810 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 1810 may also be combinations of such devices. In the case of disk storage media, the storage units 1810 may be organized into one or more volumes of redundant array of inexpensive disks (RAID). Data stored in the storage units may be stored in a compressed form (e.g., lossless compression: HUFFMAN coding, LEMPEL-ZIV WELCH coding; delta encoding: a reference to a segment plus a difference; etc.). In one embodiment, different storage units may use different compression methods (e.g., main or active storage unit from other storage units, one storage unit from another storage unit, etc.).

The metadata, such as metadata 1816, may be stored in at least some of storage units 1810, such that files can be accessed independent of another storage unit. Metadata of each storage unit includes enough information to provide access to the files it contains. In one embodiment, metadata may include fingerprints contained within data objects 1818, where a data object may represent a data segment, a compression region (CR) of data segments, or a container of one or more CRs. Fingerprints are mapped to a particular data object via metadata 1816, enabling the system to identify the location of the data object containing a segment represented by a particular fingerprint. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, the metadata information includes a file name, a storage unit identifier identifying a storage unit in which the segments associated with the file name are stored, reconstruction information for the file using the segments, and any other appropriate metadata information. In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for segments in storage units, identifying specific data objects).

In one embodiment, deduplication storage engine 1801 includes file service interface 1802, segmenter 1804, duplicate eliminator 1806, file system control 1808, and storage unit interface 1812. Deduplication storage engine 1801 receives a file or files (or data item(s)) via file service interface 1802, which may be part of a file system namespace 1820 of a file system associated with the deduplication storage engine 1801. The file system namespace 1820 refers to the way files are identified and organized in the system. An example is to organize the files hierarchically into directories or folders, which may be managed by directory manager 1822. File service interface 1802 supports a variety of protocols, including a network file system (NFS), a common Internet file system (CIFS), and a virtual tape library interface (VTL), etc.

The file(s) is/are processed by segmenter 1804 and file system control 1808. Segmenter 1804, also referred to as a content store, breaks the file(s) into variable-length segments based on a variety of rules or considerations. For example, the file(s) may be broken into segments by identifying segment boundaries using a content-based technique (e.g., a function is calculated at various locations of a file, when the function is equal to a value or when the value is a minimum, a maximum, or other value relative to other function values calculated for the file), a non-content-based technique (e.g., based on size of the segment), or any other appropriate technique. In one embodiment, a segment is restricted to a minimum and/or maximum length, to a minimum or maximum number of segments per file, or any other appropriate limitation.

In one embodiment, file system control 1808, also referred to as a file system manager, processes information to indicate the segment(s) association with a file. In some embodiments, a list of fingerprints is used to indicate segment(s) associated with a file. File system control 1808 passes segment association information (e.g., representative data such as a fingerprint) to index 1824. Index 1824 is used to locate stored segments in storage units 1810 via storage unit interface 1812. Duplicate eliminator 1806, also referred to as a segment store, identifies whether a newly received segment has already been stored in storage units 1810. In the event that a segment has already been stored in storage unit(s), a reference to the previously stored segment is stored, for example, in a segment tree associated with the file, instead of storing the newly received segment. A segment tree of a file may include one or more nodes and each node represents or references one of the deduplicated segments stored in storage units 1810 that make up the file. Segments are then packed by a container manager (which may be implemented as part of storage unit interface 1812) into one or more storage containers stored in storage units 1810. The deduplicated segments may be further compressed into one or more CRs using a variation of compression algorithms, such as a Lempel-Ziv algorithm before being stored. A container may contains one or more CRs and each CR may contain one or more deduplicated segments. A container may further contain the metadata such as fingerprints, type of the data segments, etc. that are associated with the data segments stored therein.

When a file is to be retrieved, file service interface 1802 is configured to communicate with file system control 1808 to identify appropriate segments stored in storage units 1810 via storage unit interface 1812. Storage unit interface 1812 may be implemented as part of a container manager. File system control 1808 communicates (e.g., via segmenter 1804) with index 1824 to locate appropriate segments stored in storage units via storage unit interface 1812. Appropriate segments are retrieved from the associated containers via the container manager and are used to construct the requested file. The file is provided via interface 1802 in response to the request. In one embodiment, file system control 1808 utilizes a tree (e.g., a segment tree obtained from namespace 1820) of content-based identifiers (e.g., fingerprints) to associate a file with data segments and their locations in storage unit(s). In the event that a segment associated with a given file or file changes, the content-based identifiers will change and the changes will ripple from the bottom to the top of the tree associated with the file efficiently since the appropriate content-based identifiers are easily identified using the tree structure. Note that some or all of the components as shown as part of deduplication engine 1801 may be implemented in software, hardware, or a combination thereof. For example, deduplication engine 1801 may be implemented in a form of executable instructions that can be stored in a machine-readable storage medium, where the instructions can be executed in a memory by a processor.

In one embodiment, storage system 1800 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

An electronic device or a computing device (e.g., an end station, a network device) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices include hardware, such as a set of one or more processors coupled to one or more other components—e.g., one or more non-transitory machine-readable storage media (to store code and/or data) and network connections (to transmit code and/or data using propagating signals), as well as user input/output devices (e.g., a keyboard, a touchscreen, and/or a display) in some cases. The coupling of the set of processors and other components is typically through one or more interconnects within the electronic devices (e.g., busses and possibly bridges). Thus, a non-transitory machine-readable medium of a given electronic device typically stores instructions for execution on one or more processors of that electronic device. One or more parts of an embodiment of the invention may be implemented using different combinations of software, firmware, and/or hardware.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

What is claimed is:

1. A computer-implemented method for managing cache based on approximate least recently used (LRU) cache entries, the method comprising:
   maintaining a data structure of a plurality of data elements, each data element corresponding to a cache entry of a plurality of cache entries, wherein each of the data elements can be atomically accessed by multiple threads for accessing a corresponding cache entry;
   in response to a cache eviction request from a first plurality of threads, determining an approximately least recently used cache entry among the plurality of cache entries based on values atomically accessed from a first subset of the data structure of data elements, wherein the first subset of the data structure of data elements is atomically accessed using an atomic instruction without acquiring a lock to prevent another one of the threads from accessing the first subset of the data structure of data elements to determine other approximately least recently used cache entries among the plurality of cache entries, while allowing a second of the plurality of threads accessing a second subset of the data structure concurrently, wherein determining the approximately least recently used cache entry comprises
      maintaining a running average and a running standard deviation based on timestamps of the data elements of the data structure, and
      determining a data element of the first subset of the data structure of data elements that has a value which is non-zero and at least a predetermined number of standard deviations from the running average; and
   evicting the determined approximately least recently used cache entry by populating the determined approximately least recently used cache entry with new data.

2. The method of claim 1, wherein maintaining the data structure of data elements comprises:
   in response to each access of a cache entry of the plurality of cache entries, atomically updating a data element of the data structure of data elements corresponding to the accessed cache entry with a timestamp representing when the cache entry was accessed, using an atomic instruction.

3. The method of claim 1, wherein determining the approximately least recently used cache entry comprises determining a data element with a non-zero and smallest value among the first subset of the data structure of data elements.

4. The method of claim 1, further comprising:
   determining whether the first subset of the data structure of data elements includes a data element that has the value that is at least the predetermined number of standard deviations from the running average; and
   in response to determining the first subset of the data structure does not include a data element with the value that is at least the predetermined number of standard deviations from the running average, selecting a data element of the first subset of the data structure of data elements that has a non-zero and smallest value among all data elements of the first subset of the data structure of data elements as the approximately least recently used cache entry.

5. The method of claim 1, wherein evicting the determined approximately least recently used cache entry comprises:
   updating a data element corresponding to the determined approximately least recently used cache entry with a value of zero to indicate that the cache entry is being updated; and
   after the new data has been populated in the cache entry corresponding to the determined approximately least recently used cache entry, updating the data element corresponding to the determined approximately least recently used cache entry with a timestamp of when the new data was populated.

6. The method of claim 1, further comprising:
   in response to a second thread requesting to populate a second new data to a cache entry of a plurality of cache entries, determining whether an eviction of a cache entry of the plurality of cache entries is required; and
   in response to determining eviction is required, determining a second approximately least recently used cache entry based on values atomically accessed from a second subset of the data structure of data elements, wherein the second subset of the data structure of data elements is accessed concurrently with respect to the first thread accessing the first subset, and wherein the second subset of the data structure of data elements includes at least one data element that is not included in the first subset of the data structure of data elements.

7. A non-transitory computer-readable storage medium having computer code stored therein, which when executed by a processor, cause the processor to perform operations comprising:
   maintaining a data structure of a plurality of data elements, each data element corresponding to a cache entry of a plurality of cache entries, wherein each of the data elements can be atomically accessed by multiple threads for accessing a corresponding cache entry;
   in response to a cache eviction request from a first plurality of threads, determining an approximately least recently used cache entry among the plurality of cache entries based on values atomically accessed from a first subset of the data structure of data elements, wherein the first subset of the data structure of data elements is atomically accessed using an atomic instruction without acquiring a lock to prevent another one of the threads from accessing the first subset of the data structure of data elements to determine other approximately least recently used cache entries among the plurality of cache entries, while allowing a second of the plurality of threads accessing a second subset of the data structure concurrently, wherein determining the approximately least recently used cache entry comprises
      maintaining a running average and a running standard deviation based on timestamps of the data elements of the data structure, and determining a data element of the first subset of the data structure of data elements that has a value which is non-zero and at least a predetermined number of standard deviations from the running average; and evicting the determined approximately least recently used cache entry by populating the determined approximately least recently used cache entry with new data.

8. The non-transitory computer-readable storage medium of claim 7, wherein maintaining the data structure of data elements comprises:

in response to each access of a cache entry of the plurality of cache entries, atomically updating a data element of the data structure of data elements corresponding to the accessed cache entry with a timestamp representing when the cache entry was accessed, using an atomic instruction.

9. The non-transitory computer-readable storage medium of claim 7, wherein determining the approximately least recently used cache entry comprises determining a data element with a non-zero and smallest value among the first subset of the data structure of data elements.

10. The non-transitory computer-readable storage medium of claim 8, further comprising:

determining whether the first subset of the data structure of data elements includes a data element that has the value that is at least the predetermined number of standard deviations from the running average; and in response to determining the first subset of the data structure does not include a data element with the value that is at least the predetermined number of standard deviations from the running average, selecting a data element of the first subset of the data structure of data elements that has a non-zero and smallest value among all data elements of the first subset of the data structure of data elements as the approximately least recently used cache entry.

11. The non-transitory computer-readable storage medium of claim 7, wherein evicting the determined approximately least recently used cache entry comprises:

updating a data element corresponding to the determined approximately least recently used cache entry with a value of zero to indicate that the cache entry is being updated; and after the new data has been populated in the cache entry corresponding to the determined approximately least recently used cache entry, updating the data element corresponding to the determined approximately least recently used cache entry with a timestamp of when the new data was populated.

12. The non-transitory computer-readable storage medium of claim 7, further comprising:

in response to a second thread requesting to populate a second new data to a cache entry of a plurality of cache entries, determining whether an eviction of a cache entry of the plurality of cache entries is required; and in response to determining eviction is required, determining a second approximately least recently used cache entry based on values atomically accessed from a second subset of the data structure of data elements, wherein the second subset of the data structure of data elements is accessed concurrently with respect to the first thread accessing the first subset, and wherein the second subset of the data structure of data elements includes at least one data element that is not included in the first subset of the data structure of data elements.

13. A data processing system, comprising:
a set of one or more processors; and a non-transitory machine-readable storage medium containing code, which when executed by the set of one or more processors, cause the data processing system to maintain a data structure of a plurality of data elements, each data element corresponding to a cache entry of a plurality of cache entries, wherein each of the data elements can be atomically accessed by multiple threads for accessing a corresponding cache entry, in response to a cache eviction request from a first plurality of threads, determine an approximately least recently used cache entry among the plurality of cache entries based on values atomically accessed from a first subset of the data structure of data elements, wherein the first subset of the data structure of data elements is atomically accessed using an atomic instruction without acquiring a lock to prevent another one of the threads from accessing the first subset of the data structure of data elements to determine other approximately least recently used cache entries among the plurality of cache entries, while allowing a second of the plurality of threads accessing a second subset of the data structure concurrently, wherein determining the approximately least recently used cache entry comprises maintaining a running average and a running standard deviation based on timestamps of the data elements of the data structure, and determining a data element of the first subset of the data structure of data elements that has a value which is non-zero and at least a predetermined number of standard deviations from the running average, and evict the determined approximately least recently used cache entry by populating the determined approximately least recently used cache entry with new data.

14. The data processing system of claim 13, wherein maintaining the data structure of data elements comprises the data processing system to:

in response to each access of a cache entry of the plurality of cache entries, atomically update a data element of the data structure of data elements corresponding to the accessed cache entry with a timestamp representing when the cache entry was accessed, using an atomic instruction.

15. The data processing system of claim 13, wherein determining the approximately least recently used cache entry comprises the data processing system to determine a data element with a non-zero and smallest value among the first subset of the data structure of data elements.

16. The data processing system of claim 13, wherein the non-transitory machine-readable storage medium further contains code, which when executed by the set of one or more processors, cause the data processing system to:

determine whether the first subset of the data structure of data elements includes a data element that has the value that is at least the predetermined number of standard deviations from the running average; and in response to determining the first subset of the data structure does not include a data element with the value that is at least the predetermined number of standard deviations from the running average, select a data element of the first subset of the data structure of data elements that has a non-zero and smallest value among all data elements of the first subset of the data structure of data elements as the approximately least recently used cache entry.

17. The data processing system of claim 13, wherein evicting the determined approximately least recently used cache entry comprises the data processing system to:
- update a data element corresponding to the determined approximately least recently used cache entry with a value of zero to indicate that the cache entry is being updated; and
- after the new data has been populated in the cache entry corresponding to the determined approximately least recently used cache entry, update the data element corresponding to the determined approximately least recently used cache entry with a timestamp of when the new data was populated.

18. The data processing system of claim 13, wherein the non-transitory machine-readable storage medium further contains code, which when executed by the set of one or more processors, cause the data processing system to:
- in response to a second thread requesting to populate a second new data to a cache entry of a plurality of cache entries, determine whether an eviction of a cache entry of the plurality of cache entries is required; and
- in response to determining eviction is required, determine a second approximately least recently used cache entry based on values atomically accessed from a second subset of the data structure of data elements, wherein the second subset of the data structure of data elements is accessed concurrently with respect to the first thread accessing the first subset, and wherein the second subset of the data structure of data elements includes at least one data element that is not included in the first subset of the data structure of data elements.

* * * * *